US009693351B2

(12) United States Patent
Learned

(10) Patent No.: US 9,693,351 B2
(45) Date of Patent: Jun. 27, 2017

(54) METHOD AND APPARATUS FOR RATE DETERMINATION IN A RADIO FREQUENCY SYSTEM

(71) Applicant: Massachusetts Institute of Technology, Cambridge, MA (US)

(72) Inventor: Rachel E. Learned, Waltham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 14/437,350

(22) PCT Filed: Mar. 15, 2013

(86) PCT No.: PCT/US2013/031900
§ 371 (c)(1),
(2) Date: Apr. 21, 2015

(87) PCT Pub. No.: WO2013/180816
PCT Pub. Date: Dec. 5, 2013

(65) Prior Publication Data
US 2015/0282176 A1    Oct. 1, 2015

Related U.S. Application Data

(60) Provisional application No. 61/723,440, filed on Nov. 7, 2012.

(51) Int. Cl.
*H04W 4/00* (2009.01)
*H04W 72/04* (2009.01)
(Continued)

(52) U.S. Cl.
CPC ....... *H04W 72/0453* (2013.01); *H04L 1/0003* (2013.01); *H04L 1/24* (2013.01); *H04W 24/02* (2013.01); *H04W 28/18* (2013.01)

(58) Field of Classification Search
CPC ..... H04W 24/02; H04W 16/14; H04W 28/18; H04W 72/0453; H04L 1/0003; H04L 1/24
See application file for complete search history.

(56) References Cited

U.S. PATENT DOCUMENTS 6,487,414 B1    11/2002    Tanay et al.
6,704,376 B2    3/2004    Mills et al.
(Continued)

FOREIGN PATENT DOCUMENTS

WO    WO 2010/066289 A1    6/2010
WO    WO 2011/006116 A1    1/2011
(Continued)

OTHER PUBLICATIONS

PCT International Preliminary Report dated Sep. 24, 2015 corresponding to International Application No. PCT/US2013/047026; 11 Pages.
(Continued)

Primary Examiner — Kan Yuen
(74) Attorney, Agent, or Firm — Daly, Crowley, Mofford & Durkee, LLP

(57) ABSTRACT

Techniques are described for determining rates and other parameters for users associated with a multiple access channel (MAC). In at least one embodiment, a rate determination tool having a GUI interface is provided.

17 Claims, 16 Drawing Sheets

(51) Int. Cl.
H04L 1/00 (2006.01)
H04L 1/24 (2006.01)
H04W 24/02 (2009.01)
H04W 28/18 (2009.01)

(56) References Cited

U.S. PATENT DOCUMENTS

| | | | |
|---|---|---|---|
| 6,947,505 B2 | 9/2005 | Learned | |
| 7,031,266 B1 | 4/2006 | Patel et al. | |
| 7,058,422 B2 | 6/2006 | Learned et al. | |
| 7,085,575 B2 | 8/2006 | Fabien et al. | |
| 7,092,452 B2 | 8/2006 | Taylor et al. | |
| 7,126,890 B2 | 10/2006 | Learned et al. | |
| 7,190,743 B2 | 3/2007 | Learned | |
| 7,218,690 B2 | 5/2007 | Learned | |
| 7,269,223 B2 | 9/2007 | Learned et al. | |
| 7,558,238 B1* | 7/2009 | Sun | H04B 7/2615 370/210 |
| 7,593,473 B2 | 9/2009 | Learned et al. | |
| 7,593,492 B1* | 9/2009 | Lande | H04B 1/7103 370/342 |
| 7,724,851 B2 | 5/2010 | Learned et al. | |
| 7,738,906 B2 | 6/2010 | Attar et al. | |
| 2001/0028675 A1 | 10/2001 | Bierly et al. | |
| 2002/0002052 A1 | 1/2002 | McHenry | |
| 2002/0122413 A1 | 9/2002 | Shoemake | |
| 2004/0018843 A1 | 1/2004 | Cerwall et al. | |
| 2004/0082363 A1 | 4/2004 | Hosein | |
| 2004/0235472 A1 | 11/2004 | Fujishima et al. | |
| 2005/0124347 A1 | 6/2005 | Hosein | |
| 2005/0201280 A1 | 9/2005 | Lundby et al. | |
| 2008/0089279 A1 | 4/2008 | Hu et al. | |
| 2008/0198828 A1 | 8/2008 | Reznik et al. | |
| 2008/0293353 A1 | 11/2008 | Mody et al. | |
| 2009/0154534 A1 | 6/2009 | Hassan | |
| 2009/0258597 A1 | 10/2009 | Chen et al. | |
| 2010/0124930 A1 | 5/2010 | Andrews et al. | |
| 2010/0142465 A1 | 6/2010 | Medepalli et al. | |
| 2010/0165956 A1 | 7/2010 | Razzell | |
| 2010/0289688 A1 | 11/2010 | Sherman et al. | |
| 2010/0304770 A1 | 12/2010 | Wietfeldt et al. | |
| 2011/0021153 A1 | 1/2011 | Safavi | |
| 2011/0093540 A1 | 4/2011 | Eisenberg et al. | |
| 2011/0176508 A1 | 7/2011 | Altintas et al. | |
| 2011/0286351 A1 | 11/2011 | Reudink | |
| 2012/0039183 A1 | 2/2012 | Barbieri et al. | |
| 2012/0069941 A1 | 3/2012 | Herbig | |
| 2012/0071102 A1 | 3/2012 | Palomar et al. | |
| 2012/0108276 A1 | 5/2012 | Lang et al. | |
| 2013/0035108 A1 | 2/2013 | Joslyn et al. | |
| 2013/0244681 A1 | 9/2013 | Ookubo et al. | |
| 2014/0126488 A1 | 5/2014 | Learned | |
| 2014/0293867 A1 | 10/2014 | Horiuchi et al. | |
| 2014/0314003 A1 | 10/2014 | Zhou et al. | |
| 2014/0348004 A1 | 11/2014 | Ponnuswamy | |
| 2015/0049721 A1 | 2/2015 | Wijting et al. | |
| 2015/0311971 A1* | 10/2015 | Learned | H04B 7/086 370/329 |

FOREIGN PATENT DOCUMENTS

| | | |
|---|---|---|
| WO | WO 2011/055319 A1 | 5/2011 |
| WO | WO 2013/185150 A1 | 12/2013 |
| WO | WO 2014/052992 A1 | 4/2014 |
| WO | WO 2016/053406 A1 | 4/2016 |
| WO | WO 2016/053406 A9 | 5/2016 |
| WO | WO 2016/114844 A2 | 7/2016 |

OTHER PUBLICATIONS

U.S. Appl. No. 14/867,687, filed Sep. 28, 2015, Learned.
U.S. Appl. No. 14/585,780, filed Dec. 30, 2014, Learned.
Ahmed, et al.; "Entropy Expressions and Their Estimators for Multivariate Distributions;" IEEE Transactions on Information Theory; vol. 35; No. 3; May 1989; pp. 688-692.
Bahl, et al.; "Optimal Decoding of Linear Codes for Minimizing Symbol Error Rate;" IEEE Transactions on Information Theory; Mar. 1974; pp. 284-287.
Learned; "Making Optimal Use of the Asymmetric Inference Channel;" IEEE; Signals, Systems and Computers (Asilomar); Nov. 6-9, 2011; pp. 1722-1727.
Learned; "Making Optimal Use of the Asymmetric Interference Channel;" Asilomar Conference on Signals, Systems, and Computing; Presentation; Nov. 8, 2011; 63 pages.
Neeser, et al.; "Proper Complex Random Processes with Applications to Information Theory;" IEEE Transactions on Information Theory; vol. 39; No. 4; Jul. 1993; pp. 1293-1302.
Pham; "Fast Algorithms for Mutual Information Based Independent Component Analysis;" IEEE Transactions on Signal Processing; vol. 52; No. 10; Oct. 2004; pp. 2690-2700.
Tufts; "Design Problems in Pulse Transmission;" Technical Report 368; Massachusetts Institute of Technology; Jul. 28, 1960; 52 pages.
Tufts; "Nyquist's Problem—The Joint Optimization of Transmitter and Receiver in Pulse Amplitude Modulation;" Proceedings of the IEEE: vol. 53; Issue 3; pp. 248-259.
Ungerboeck; "Channel Coding with Multilevel/Phase Signals;" IEEE Transactions on Information Theory; vol. IT-28; No. 1; Jan. 1982; pp. 55-67.
Verdu; "The Capacity Region of the Symbol-Asynchronous Gaussian Multiple-Access Chanel;" IEEE Transactions on Information Theory; vol. 35; No. 4; Jul. 1989; pp. 733-751.
Office Action dated Feb. 4, 2015 for U.S. Appl. No. 13/998,566, filed Nov. 7, 2013.
International Search Report of the ISA for PCT/US2013/47026 dated Jun. 21 2013.
Written Opinion of the ISA for PCT/US2013/47026 dated Jun. 21, 2013.
International Search Report of the ISA for PCT/US2013/68710 dated Jan. 7, 2014.
Written Opinion of the ISA for PCT/US2013/68710 dated Jan. 7, 2014.
International Search Report of the ISA for PCT/US2013/031900 dated Jan. 15, 2014.
Written Opinion of the ISA for PCT/US2013/031900 dated Jan. 15, 2014.
Response to Office Action dated Feb. 4, 2015 corresponding to U.S. Appl. No. 13/998,566; Response filed on May 4, 2015; 8 Pages.
PCT International Preliminary Report dated May 21, 2015 corresponding to International Application No. PCT/US2013/031900; 9 Pages.
PCT International Preliminary Report dated May 21, 2015 corresponding to International Application No. PCT/US2013/068710; 9 Pages.
Notice of Allowance dated Jun. 8, 2015 corresponding to U.S. Appl. No. 13/998,566; 17 Pages.
PCT International Search Report and Written Opinion dated Jul. 15, 2016 corresponding to International Application No. PCT/US2015/058586; 12 Pages.
Office Action dated Sep. 9, 2016, for Application No. 14/585,780; 27 pages.
PCT International Search Report and Written Opinion dated Feb. 26, 2016 for PCT International Application No. PCT/US2015/035963; 11 Pages.
U.S. Office Action dated Oct. 12, 2016 corresponding to U.S. Appl. No. 14/648,049; 33 Pages.
U.S. Restriction Requirement dated Nov. 9, 2016 corresponding to U.S. Appl. No. 14/437,882; 7 Pages.
Response to Restriction Requirement dated Nov. 9, 2016 corresponding to U.S. Appl. No. 14/437,882; Response filed on Nov. 29, 2016; 1 Page.
Response to U.S. Office Action dated Sep. 9, 2016 corresponding to U.S. Appl. No. 14/585,780; Response filed Dec. 7, 2016; 6 Pages.
U.S. Office Action dated Jan. 5, 2017 corresponding to U.S. Appl. No. 14/437,882; 11 Pages.

(56) References Cited

OTHER PUBLICATIONS

PCT International Preliminary Report dated Dec. 29, 2016 corresponding to International Application No. PCT/US2015/035963; 7 Pages.

U.S. Appl. No. 15/317,750, filed Dec. 9, 2016, Learned.

Response to U.S. Non-Final Office Action dated Jan. 5, 2017 for U.S. Appl. No. 14/437,882; Response filed on Jan. 31, 2017; 13 Pages.

Response to U.S. Non-Final Office Action dated Oct. 12, 2016 for U.S. Appl. No. 14/648,049; Response filed on Jan. 31, 2017; 13 Pages.

U.S. Notice of Allowance dated Mar. 22, 2017 corresponding to U.S. Appl. No. 14/585,780; 14 Pages.

* cited by examiner

METHOD AND APPARATUS FOR RATE DETERMINATION IN A RADIO FREQUENCY SYSTEM

CROSS REFERENCE TO RELATED APPLICATION

This application is a U.S. National Stage of PCT application PCT/US2013/031900 filed in the English language on Mar. 15, 2013, and entitled "METHOD AND APPARATUS FOR RATE DETERMINATION IN A RADIO FREQUENCY SYSTEM," which claims the benefit under 35 U.S.C. §119 of provisional application No. 61/723,440 filed Nov. 7, 2012, which application is hereby incorporated herein by reference in its entirety.

GOVERNMENT RIGHTS

This invention was made with government support under Contract No. FA8721-05-C-0002 awarded by the U.S. Air Force. The government has certain rights in the invention.

FIELD

Subject matter disclosed herein relates generally to radio frequency (RF) systems and, more particularly, to techniques for determining rate information for use in analyzing and/or adapting to an RF environment.

BACKGROUND

As the consumer market continues to rise for smart phones and wireless data service, the demand for more and more throughput increases drastically and the radio spectrum continues to become more crowded. A new paradigm in wireless communication is emerging where radios can be built to withstand interference to the level where interference is no longer avoided. Interference is allowed, even invited, to allow for more wireless devices to make use of the scarce free space in the wireless spectrum. For example, the LTE Advanced standard (to support the HetNet feature) allows interference. If this new feature is enabled, reliable performance would require mobiles to have some kind of interference mitigation in the receivers.

Techniques, systems, and devices are needed that will support operation in systems that permit the co-occupation of a radio frequency (RF) band or channel.

SUMMARY

In accordance with one aspect of the concepts, systems, circuits, and techniques described herein, a machine implemented method for use in a wireless system comprises: determining a data rate for a first user operating in a radio frequency (RF) band; estimating a maximum sum rate that can be achieved if a second user co-occupies the RF band with the first user, for a number of different transmit parameter combinations of the second user, and selecting a transmit parameter combination for the second user based, at least in part, on estimated sum rate.

In one embodiment, the transmit parameter combinations each include at least one of: a modulation type, a power level, and a rate.

In one embodiment, determining a data rate, estimating a maximum sum rate, and selecting a transmit parameter combination are performed within a communication device associated with the second user.

In one embodiment, the method further comprises: monitoring said RF band to detect RF energy within the RF band before determining the data rate for the first user; characterizing RF energy received during monitoring; and determining whether the RF band is currently occupied by a user based on the characterization.

In one embodiment, determining a data rate for a first user operating in the RF band comprises: calculating an entropy of a signal within the RF band; calculating an entropy of noise associated with the signal; and determining a rate for the signal within the RF band based, at least in part, on the entropy of the signal and the entropy of the noise.

In one embodiment, characterizing energy received during monitoring comprises: creating an in-phase/quadrature (I/Q) histogram based on the received energy; generating an I/Q plot using the I/Q histogram; and estimating a probability density function (pdf) based on the I/Q plot.

In one embodiment, determining whether the RF band is currently occupied by a user based on the characterization comprises analyzing the pdf to identify indicia of a structured signal.

In one embodiment, analyzing the pdf to identify indicia of a structured signal includes analyzing the pdf to identify a constellation associated with a specific modulation scheme.

In one embodiment, the method further comprises: choosing an occupied RF band to operate within from a plurality of identified occupied bands, wherein determining a data rate for a first user operating in a radio frequency (RF) band includes determining a data rate for a user currently operating in the chosen RF band.

In one embodiment, estimating a maximum sum rate that can be achieved if a second user co-occupies the RF band with the first user includes considering the availability and complexity of one or more multi-user detector (MUD) in a wireless device associated with the second user.

In accordance with another aspect of the concepts, systems, circuits, and techniques described herein, a machine implemented method for use in a wireless system comprises: monitoring a first RF band to detect RF energy within the first RF band; characterizing energy received during monitoring the first RF band, wherein characterizing energy includes: digitizing the received energy; creating an in-phase/quadrature (I/Q) histogram based on the digitized received energy; generating an I/Q plot using the I/Q histogram; and estimating a probability density function (pdf) based on the I/Q plot; determining whether the first RF band is currently occupied by a user by analyzing the pdf to identify indicia of a structured signal; and if the first RF band is currently occupied by a user, computing a rate associated with the user.

In one embodiment, creating an I/Q histogram includes creating the I/Q histogram based on a specific combination of center frequency, baud rate, and delay.

In one embodiment, creating an I/Q histogram includes re-sampling samples generated during digitizing based on the specific combination of center frequency, baud rate, and delay.

In one embodiment, computing a rate associated with the user comprises: computing an entropy associated with a signal detected in the first RF band; computing an entropy associated with actual noise in the first RF band; and computing the rate based on the entropy of the signal and the entropy of the noise.

In one embodiment, the method further comprises: if the first RF band is not currently occupied by a user, repeating monitoring, characterizing, determining, and computing for a second RF band that is different from the first RF band.

In accordance with still another aspect of the concepts, systems, circuits, and techniques described herein, a computer analysis tool to analyze a multiple access channel (MAC) comprises: a graphical user interface (GUI) to receive input from an operator and to display analysis results to the operator, the GUI including: a first GUI input element to allow the operator to specify a first coding scheme associated with a first user in a MAC; a second GUI input element to allow the operator to specify a second coding scheme associated with a second user in the MAC; a third GUI input element to allow the operator to specify a first quality metric associated with the first user, and a fourth GUI input element to allow the operator to specify a second quality metric associated with the second user; and at least one processor to generate a sum rate for the MAC based, at least on part, on the first coding scheme, the second coding scheme, the first quality metric, and the second quality metric.

In one embodiment, the first quality metric associated with the first user is a first signal to noise ratio and the second quality metric associated with the second user is a second signal to noise ratio.

In one embodiment, the at least one processor is capable of generating a probability density function (pdf) for the MAC based, at least on part, on the first coding scheme, the second coding scheme, the first quality metric, and the second quality metric; and the GUI further comprises a display area to display the pdf associated with the MAC.

In one embodiment, the GUI further comprises a display area to display a rate plot associated with the MAC, the rate plot showing rate information for the MAC including the sum rate generated by the at least one processor.

In one embodiment, the at least one processor is capable of generating a metric that is a measure of how far into a rate region the sum rate extends; and the GUI further comprises a display area to display a value of the metric.

In one embodiment, the metric is calculated as follows:

$$\text{metric} = \frac{b-a}{c-a} \times 100$$

where a is a coded rate, b is the sum rate, and c is a maximum possible rate of the modulation pair for the first and second users.

In accordance with a further aspect of the concepts, systems, circuits, and techniques described herein, a machine implemented method for determining a rate for the second user on channel (SUOC) in a multiple access channel (MAC) having a first user on channel (FUOC) and a SUOC, the method comprising: measuring operational parameters associated with the FUOC and the SUOC; calculating rate lines associated with a rate region of the MAC using the measured operational parameters; determining a rate associated with the FUOC; and comparing the rate associated with the FUOC to the rate lines of the rate region to identify a list of possible rates and corresponding MUD receiver types for use by the SUOC.

In one embodiment, the method further comprises: determining MUD receiver types that are available to the SUOC; and removing entries from the list that require MUD receiver types that are not available.

In one embodiment, the method further comprises selecting a rate and MUD receiver type for the SUOC from the modified list.

In one embodiment, measuring operational parameters associated with the FUOC and the SUOC comprises measuring one or more of the following: received power associated with the FUOC, transmitter received power associated with the SUOC, noise only power measured by a SUOC receiver, received signal to noise ratio (SNR) associated with the FUOC, received SNR associated with the FUOC, cross correlation of received signature pulses of the FUOC and the SUOC, and baud duration.

DETAILED DESCRIPTION

Techniques and structures are described herein for determining transmission rates for one or more users in a multiple access channel. In some implementations, one or more channels may initially be identified that are already occupied by a user. A transmission rate may be determined for the user occupying each channel. Transmission rates and sum rates may be calculated for various combinations of transmit parameters for use by a second user in the channel. The sum rates may then be used to select a group of transmit parameters for use by the second user in the multiple access channel. In some implementations, it may be assumed that the second user has access to a multi-user detection (MUD) enabled receiver to allow received signals from the first user to be reduced or eliminated during a receive process. Knowledge of the presence and complexity of a MUD receiver may be used during the rate determination process. The described techniques and structures may be used within, among other things, software defined radio systems and cognitive radio systems.

In various implementations, the techniques and structures described herein may be used in connection with radio systems that are capable of assessing a radio frequency (RF) spectrum, determining candidate bands in which other independent radios are operating, and successfully co-existing within RF bands with one or more independent radios. In some scenarios, such radios may be capable of successfully transmitting and receiving in already-occupied bands without detrimental harm to pre-existing radio systems already operating in those bands. Moreover, these radios may be able to share a band with a pre-existing radio system without requiring any special capabilities on the part of the pre-existing radio or any communication or coordination with the pre-existing radio.

Figure 1:
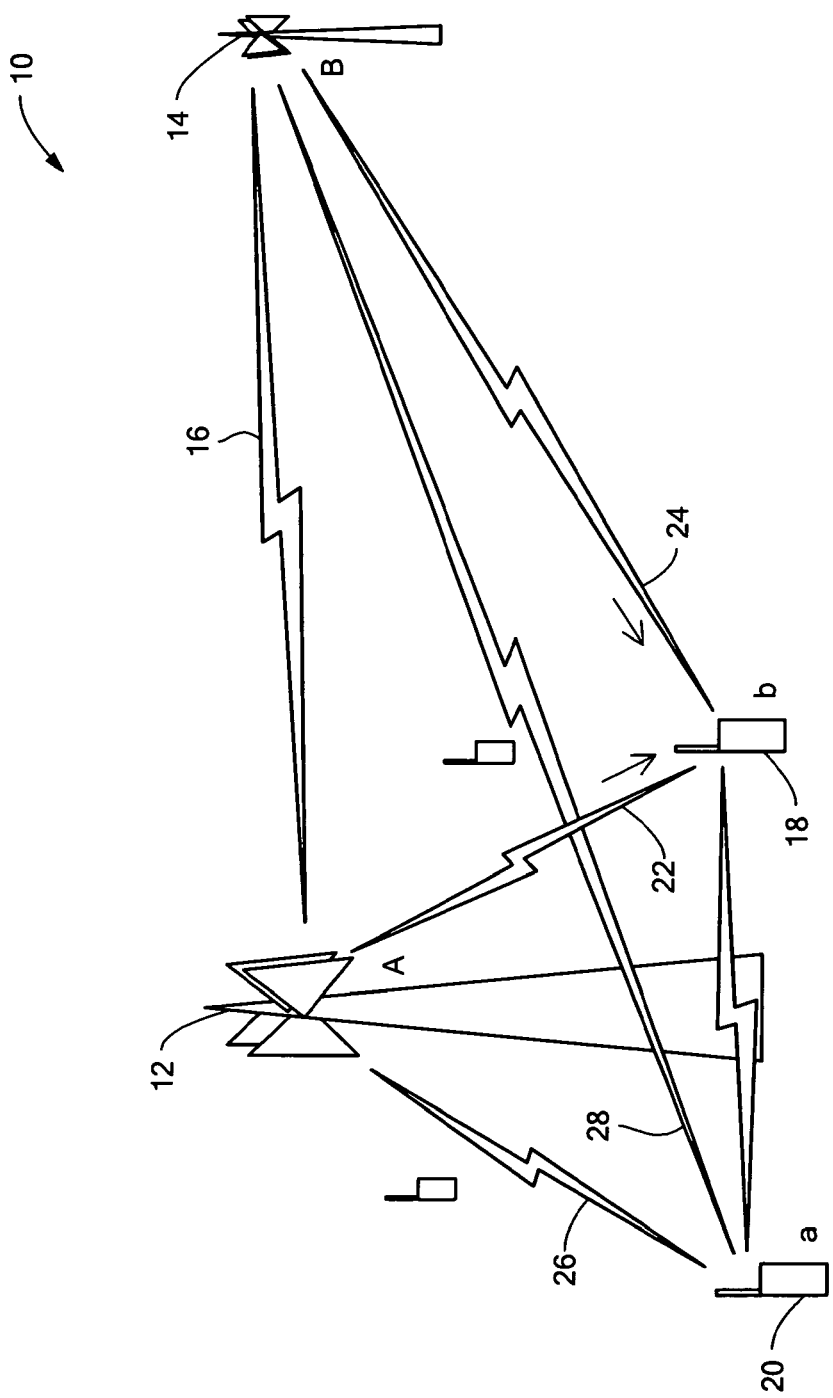
FIG. 1 is a schematic diagram illustrating an exemplary wireless network arrangement within which techniques and structures described herein may be used.

FIG. 1 is a schematic diagram illustrating a wireless network arrangement 10 within which the techniques and structures described herein may be used in some implementations. As shown in FIG. 1, a first wireless node (node A) 12 may be communicating with a second wireless node (node B) 14 via a wireless link 16 within a particular wireless band or channel. The band or channel may be associated with, for example, a particular wireless networking or wireless cellular standard. A third wireless node 18, located in a vicinity of first and second wireless nodes 12, 14, may then decide to establish a connection with a fourth wireless node 20. Instead of finding a free band or channel to communicate within, third wireless node 18 may decide to communicate with fourth wireless node 20 within a channel or band already occupied by first and second nodes 12, 14. That is, wireless node 18 may decide to share a portion of the wireless spectrum with first and second nodes 12, 14.

In some embodiments, third wireless node 18 (and possibly fourth wireless node 20) may include a MUD receiver to facilitate operation within an occupied channel. In a conventional receiver, signal components of a received signal that are associated with users other than a user-of-interest are typically treated as interference or noise when detecting and decoding signals associated with the user-of-interest. In a MUD receiver, on the other hand, the signal components associated with the other users may be effectively removed from a receive signal to allow signal components of interest to be more accurately detected and decoded. In this manner, when a MUD is used, an occupied channel can, to some extent, be equivalent to a free and clear channel.

As used herein, the node or nodes that are first to occupy a particular band or channel (or the user associated therewith) will be referred to as the "first user on channel" or "FUOC" and the node or nodes that are second to occupy the band or channel (or the user associated therewith) will be referred to as the "second user on channel" or "SUOC." In addition, as used herein, an unoccupied band, channel, or portion of spectrum will be referred to as a "white space" and an occupied band, channel, or portion of spectrum will be referred to as a "black space" or a "grey space."

Third wireless node 18 may decide to share spectrum with first and second nodes 12, 14 for any number of reasons. For example, in one possible scenario, all bands or channels currently available to third wireless node 18 for communication may be occupied and, therefore, the only communication option available may be an occupied channel. In another possible scenario, third wireless node 18 may be configured to prefer an occupied channel over a free channel (but will select a free channel if no occupied channels currently exist). In still another scenario, third wireless node 18 may only be licensed to transmit within an occupied band or channel. Other reasons for deciding to transmit within an occupied channel may also exist.

Before deciding to use the same band or channel as first and second nodes 12, 14, third wireless node 18 may analyze the different channels available to it and make a decision based on the results of the analyses. For example, third node 18 may check each channel available to it to determine whether the channel is currently occupied by one or more other nodes. If occupied, third node 18 may analyze signals received within the channel to determine one or more operational parameters associated with the other user(s) occupying the channel. For example, in a channel occupied by first and second nodes 12, 14, third node 18 may analyze signals received from the nodes 12, 14 (via paths 22, 24) to determine operational parameters associated with these nodes (e.g., receive power level at node 18, signature pulse shape, modulation and coding scheme, timing and/or phase offset relative to a reference, baud rate, symbol duration, channel transfer function, multipath characterization, and/or others). After checking some or all of the available channels, third node 18 may then use the collected information to make a decision as to the channel it will use to communicate with fourth node 20.

In some embodiments, third and fourth nodes 18, 20 may communicate with one another before a channel is formally selected to facilitate the channel selection process. For example, fourth node 20 may deliver power level information to third node 18 indicating power levels being received at fourth node 20 from first and second nodes 12, 14 (via paths 26, 28, respectively). This information may then be considered by third node 18 during the channel selection process. Ultimately, as described above, third node 18 may decide to communicate with fourth node 20 via a band that is already occupied by first and second nodes 12, 14. It should be appreciated that third and fourth nodes 18, 20 are not necessarily communicating with one another using the same protocol or wireless standard as first and second nodes 12, 14 (although this could be the case). That is, in some implementations, first and second nodes 12, 14 may use a different wireless standard or protocol than third and fourth nodes 18, 20, although both may be operating within the same spectrum portion.

In some implementations, there may be no communication or coordination between first and second nodes 12, 14, on the one hand, and third and fourth nodes 18, 20, on the other hand, during the channel selection process. That is, third node 18 (or third and fourth nodes 18, 20, together) may decide to share a channel or band currently occupied by first and second nodes 12, 14 on its own, based on signal analysis results, without informing first and second nodes 12, 14. In some embodiments, first and second nodes 12, 14 may have built in adaptation functionality that allow the units to adapt to the changed RF environment after third and fourth nodes 18, 20 begin to communicate.

Figure 2:
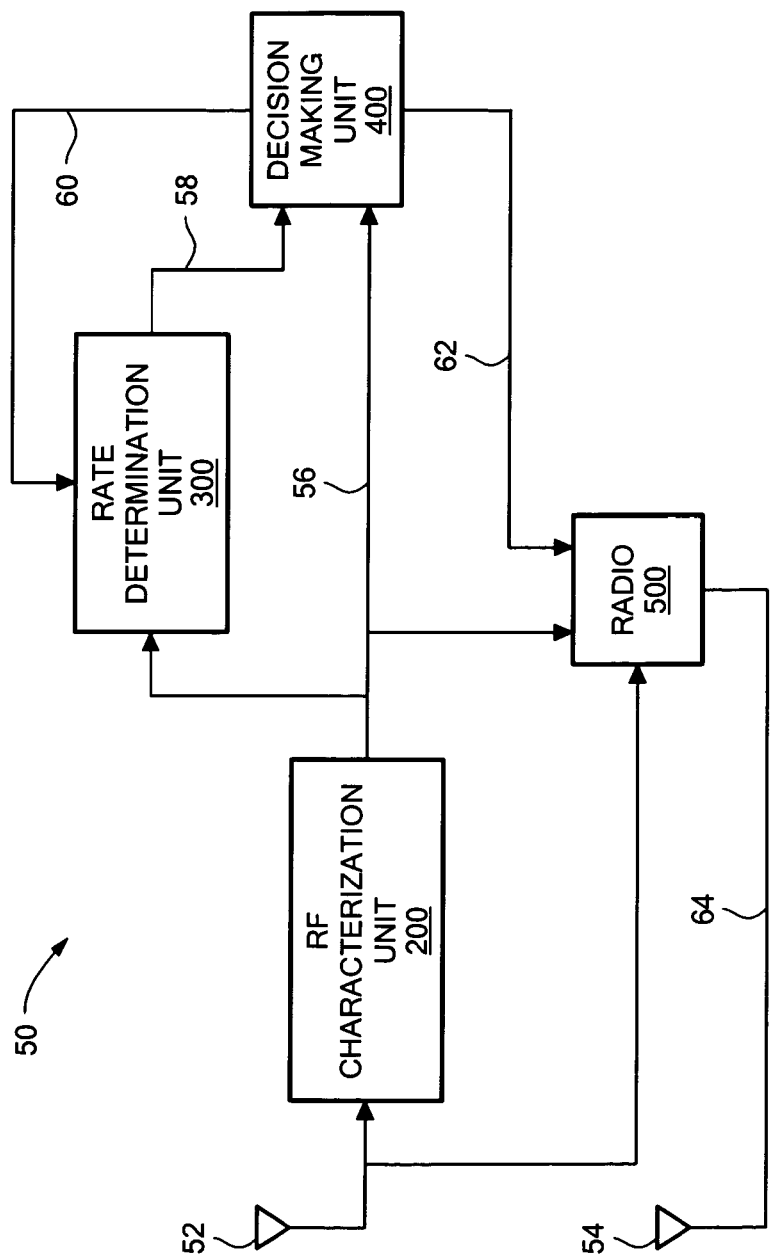
FIG. 2 is a block diagram illustrating a wireless transceiver system in accordance with an embodiment.

FIG. 2 is a block diagram illustrating a wireless transceiver system 50 in accordance with an embodiment. Wireless transceiver system 50 may be used in a SUOC node in some implementations (e.g., third wireless node 18 of FIG. 1). As illustrated, wireless transceiver system 50 may include: an RF characterization unit 200, a rate determination unit 300, a decision making unit 400, and a radio 500. The radio 500 may include at least one RF receiver and at least one RF transmitter. The RF receiver may include one or more MUD receivers. Wireless transceiver system 50 may also include one or more receive antennas 52 to receive RF signals from a surrounding environment and one or more transmit antennas 54 to transmit RF signals into a surrounding environment. In some embodiments, a single antenna or group of antennas may be used during both transmit and receive operations (using, for example, a duplexer, a switch, or similar antenna sharing device). Any types of antennas may be used including, for example, dipoles, monopoles, patches, helical antennas, horns, antenna arrays, MIMO arrangements, and/or others.

RF characterization unit 200 monitors RF energy received at antenna 52 and characterizes the energy based on one or more criteria. In at least one implementation, RF characterization unit 200 monitors each band or channel (or at least some of the channels) that wireless transceiver system 50 can operate within to determine whether, for example, the bands or channels are currently occupied by another user or system. If a band or channel is occupied, RF characterization unit 200 may determine one or more operational parameters associated with the user currently occupying the band. This information 56 may include, for example, bandwidth, receive power level, signature pulse shape, modulation scheme, timing and/or phase offset relative to a reference, baud rate, symbol duration, channel transfer function, multipath characterization, and/or others. RF characterization unit 200 may deliver this information 56 to rate determination unit 300 for each occupied channel analyzed.

Rate determination unit 300 is operative for determining, for each occupied channel identified by RF characterization unit 200, a suggested rate that may be used by wireless transceiver system 50 operating as a SUOC in the channel. Rate determination unit 300 may also determine a sum rate for the occupied channel which represents the combination of rates of the FUOC user and the SUOC user. Rate detamination unit 300 may then deliver this rate information 58 (and possibly power information) to decision making unit 400 which may use the information 58 to select an occupied channel for wireless transceiver system 50 to operate within (as a SUOC).

As described above, radio 500 may include an RF receiver having a MUD receiver. In such an embodiment, rate determination unit 300 may take the presence of the MUD receiver into account when determining the rates that can be achieved in the occupied channel. That is, rate determination unit 300 may determine a rate for the SUOC that will allow the particular MUD receiver that is present within radio 500 to accurately extract the desired SUOC data from the received signal in the presence of the FUOC signal. As is well known, MUD receivers may be implemented with a range of different complexity levels. Typically, high complexity MUD receivers are more accurate, but require a large amount of processing power to implement. Less complex MUD receivers are typically less accurate, but can be implemented using less powerful and less expensive processors. In some embodiments, radio 500 of FIG. 2 may include an RF receiver that is capable of implementing multiple MUD receivers of different complexity levels. In such an embodiment, rate determination unit 300 may determine rates for an occupied channel for each of the available MUDs. As described above, this rate information may be delivered to decision making unit 400 to be used to select a channel.

In the illustrated embodiment, decision making unit 400 receives rate (and possibly power) information 58 from rate determination unit 300 and RF characterization information 56 from RF characterization unit 200 for the identified FUOC channels. Decision making unit 400 may then use this information to select a FUOC channel for wireless transceiver system 50, and one or more other SUOC nodes, to operate within. In addition to selecting a FUOC-occupied channel, decision making unit 400 may also select transmit parameters (e.g., waveform, modulation and coding scheme, data rate, transmit power levels, etc.) for use by one or more SUOC nodes to communicate within the occupied channel.

In at least one embodiment, RF characterization unit 200 may measure receive power information for one or more signals received from a remote SUOC node. This information may then be delivered to decision making unit 400 for use in making, for example, a channel decision. In some implementations, decision making unit 400 may deliver minimum and maximum SUOC transmit power limits 60 to rate determination unit 300 for use in rate and/or power determination.

As described above, in some implementations, decision making unit 400 may be configured to only select an occupied channel (i.e., black or grey space) for use by wireless transceiver system 50. In other implementations, decision making unit 400 may be permitted, in some situations, to select an unoccupied channel (i.e., white space) for use by wireless transceiver system 50.

Decision making unit 400 may deliver the selected FUOC channel information and RF operating parameters 62 to radio 500. In addition, in some implementations, RF characterization unit 200 may deliver the signal characterization information 56 for the various FUOC channels to radio 500. Radio 500 may use some or all of this information to assemble and transmit a configuration signal 64 to a remote SUOC node (or nodes) to inform the other node as to the channel and transmit parameters to use to communicate with wireless transceiver system 50 and other SUOC nodes (if any). Radio 500 may also use the information 62 received from decision making unit 400 to configure a receiver to receive signals having the identified characteristics. In at least one embodiment, radio 500 may be implemented using chains of discrete analog RF components having variable settings (e.g., a receive chain and a transmit chain). In other implementations, some or all of radio 500 may use digital processing techniques and/or software defined radio (SDR) techniques.

Radio 500 may also be configured to receive a configuration signal from a remote SUOC node identifying transmit parameters to be used to transmit signals to the remote node within the FUOC channel. Radio 500 may then use this configuration signal to configure an RF transmitter therein to generate signals in accordance with the identified parameters. In some embodiments, radio 500 will be capable of generating signals in accordance with one or more wireless networking standards (e.g., IEEE 802.11, IEEE 802.15, IEEE 802.16, Ultrawideband, Bluetooth, Zigbee, etc.) and/or one or more wireless cellular standards (e.g., GSM, GPRS, EDGE, LTE, 3G, 4G, IS-95, W-CDMA, HSPA, etc.). In these embodiments, the signal parameter information generated by decision making unit 400 or a remote node may be in accordance with the particular standards being implemented.

After a remote SUOC node has been configured with the operating parameter information selected by decision making unit 400, the remote SUOC node may transmit a signal to wireless transceiver system 50. This signal may then be received by receive antenna 52 and delivered to radio 500. Because the FUOC system may also be transmitting, the signal delivered to radio 500 may be corrupted by the FUOC signals. Radio 500 may then use its MUD receiver (or one of multiple MUD receivers) to remove the FUOC signal energy from the received signal. The data associated with the desired SUOC user of interest may then be detected, decoded, and output by radio 500.

If wireless transceiver system 50 has data to be transmitted to one or more other SUOC nodes, a transmitter within radio 500 may be used to assemble and transmit the signal from transmit antenna 54. An RF receiver within a remote SUOC node may then receive and process the signal using, for example, a MUD receiver. In some implementations, different transmit parameters may be used by wireless transceiver system 50 and a remote SUOC node communicating with wireless transceiver system 50. That is, the transmit parameters associated with the remote SUOC node may be selected by decision making unit 400 of wireless transceiver system 50 and the transmit parameters associated with wireless transceiver system 50 may be selected by a decision making unit of the remote SUOC node. This is because the FUOC receive power levels of interest for determining the transmit signal parameters are the power levels at the receiver of the remote node. In some implementations, all SUOC nodes may use the same transmit signals parameters. It should be appreciated that the SUOC transmit signal parameters and the FUOC transmit signal parameters in a given network arrangement may change or adapt over time.

In at least one implementation, a FUOC system may possess the ability to adapt to a current RF environment or may possess cognitive radio capabilities that include the ability to sense the environment, adapt to the environment, and even learn and/or predict what to do to robustly operate within the environment. In one possible approach, a FUOC system may include an instantiation of the techniques and structures described herein that may have initially selected a free and clear channel to occupy. After a SUOC node selects an occupied channel to operate within, the node may take advantage of the adaptive nature of a corresponding FUOC system to enable modulation, power, and/or rate adaptation in the FUOC's transmitted signal to bring about an evolution that results in a coexistence of the FUOC and SUOC in the channel originally occupied by the FUOC alone. A rate pair and transmit power pair that is acceptable to both the FUOC and SUOC may be reached by active-intelligent actions emitted by the SUOC and reactive adaptations of the FUOC, with no direct communication between the two systems.

In at least one embodiment, RF characterization unit 200, rate determination unit 300, decision making unit 400, and radio 500 of wireless transceiver system 50 may be implemented, either partially or fully, using one or more digital processing devices to perform corresponding functions. The digital processing device(s) may include, for example, a general purpose microprocessor, a digital signal processor (DSP), a reduced instruction set computer (RISC), a complex instruction set computer (CISC), a field programmable gate array (FPGA), a programmable logic array (PLA), a programmable logic device (PLD), an application specific integrated circuit (ASIC), a controller, a microcontroller, a reconfigurable hardware device, and/or others, including combinations of the above. Hardware, software, firmware, and hybrid implementations may be used. Although not shown, wireless transceiver system 50 may also include memory for storing, for example, an operating system, one or more application programs, user data, and/or other digital data and programs.

Figure 3:
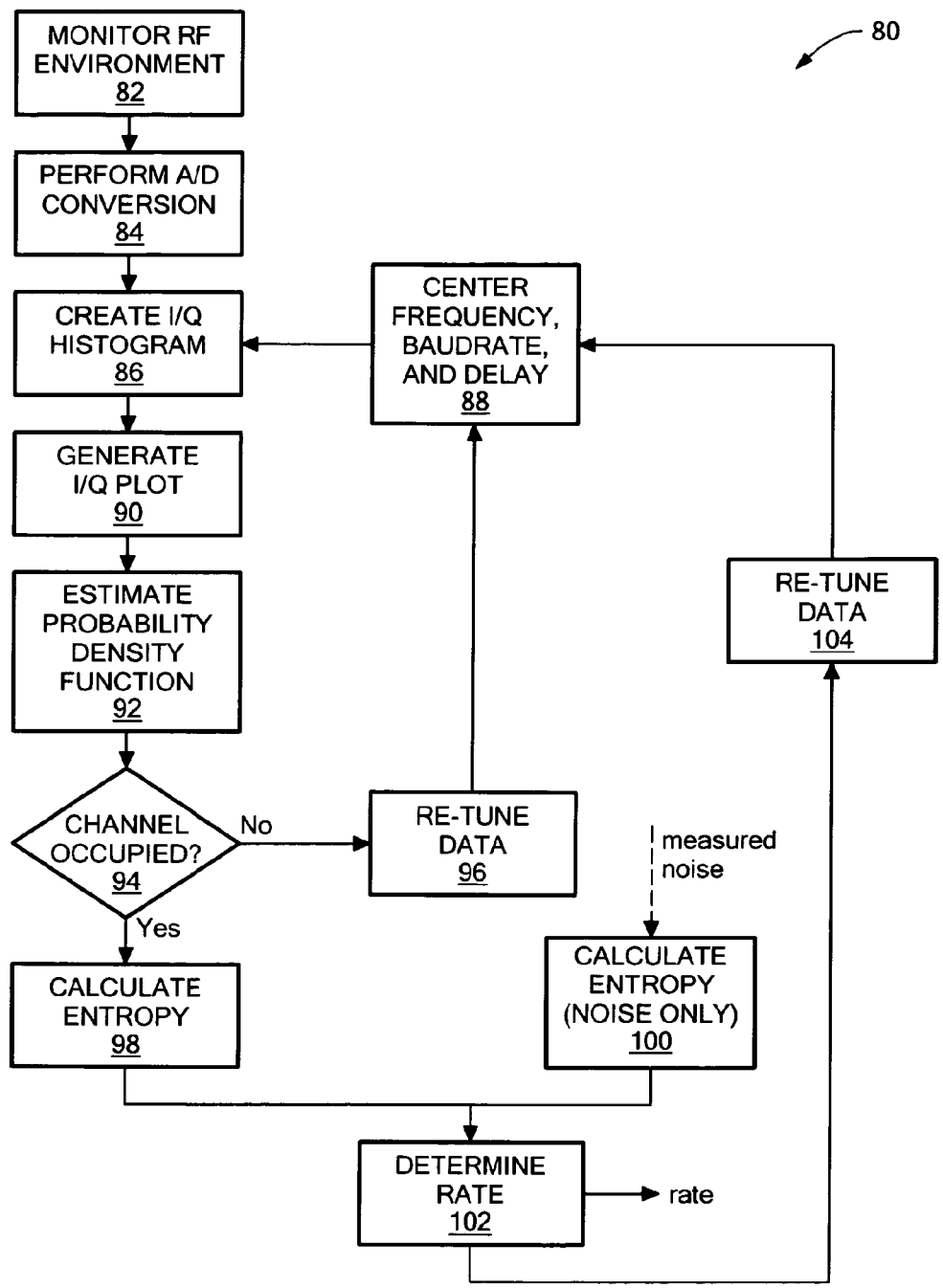
FIG. 3 is a flow diagram illustrating an exemplary method for identifying occupied channels and for calculating rates for signals within the occupied channels in accordance with an embodiment.

FIG. 3 is a flow diagram showing a process for identifying occupied channels and for calculating rates for signals within the occupied channels.

The rectangular elements (typified by element 82 in FIG. 3) are herein denoted "processing blocks" and may represent computer software instructions or groups of instructions. It should be noted that the flow diagram of FIG. 3 (and the other flow diagrams and flow charts herein) represents one exemplary embodiment of the design described herein and variations in such a diagram, which generally follow the process outlined, are considered to be within the scope of the concepts, systems, and techniques described and claimed herein.

Alternatively, some or all of the processing blocks may represent operations performed by functionally equivalent circuits such as a digital signal processor (DSP) circuit, an application specific integrated circuit (ASIC), a field programmable gate array (FPGA) circuit, an analog electronic circuit, and/or others. Some processing blocks may be manually performed while other processing blocks may be performed by a processor or other circuit. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described in the flow diagrams herein are unordered meaning that, when possible, the sequences shown can be performed in any convenient or desirable order.

Turning now to FIG. 3, an exemplary method 80 for identifying occupied channels and for calculating rates for signals within the occupied channels will be described. The method 80 may be performed in connection with, for example, wireless transceiver system 50 of FIG. 2 (within, for example, RF characterization unit 200 and rate determination unit 300) and/or other wireless devices, systems, or components. A wireless environment around an RF system may be monitored using, for example, one or more receive antennas or other transducers and a receiver (block 82). Captured RF energy may be converted from an analog representation to a digital representation (block 84). The digital samples may be used to create an I/Q histogram (or a similar data structure) for the received RF energy to keep track of a distribution of power levels in the detected energy (block 86). The histogram may be generated based on a specific center frequency, baud rate (or symbol rate), and delay under test (block 88). To do this, the original samples may be re-sampled based on the particular combination of center frequency, baud rate, and delay currently being tested. The I/Q histogram may then be used to generate an I/Q plot (block 90).

A probability density function (pdf) may next be estimated using the I/Q plot (block 92). The estimation of the pdf acts as a smoothing function for the I/Q plot. If a structured signal exists within the band under test (e.g., the band defined by the center frequency, baud rate, and delay currently being tested), the pdf will display indicia of the structured signal. That is, for a digitally modulated signal, the pdf will roughly show the constellation of the modulation scheme being used (e.g., BPSK, QPSK, 8PSK, QAM, etc.). It may next be determined whether the estimated pdf indicates that the band under test is currently occupied (e.g., has a structured signal been found) (block 94). If it is determined that the current band under test is not occupied (block 94-N), method 80 may proceed to test a new band. That is, the band information (e.g., center frequency, baud rate, and delay) may be changed (blocks 96, 88) and the above-described process may be repeated.

If it is determined that the current band under test is occupied (block 94-Y), then a rate may be computed for the signal occupying the band. As will be described in greater detail, this rate may later be useful in estimating a possible rate for a SUOC node to possibly co-exist in the occupied channel with the current FUOC. An entropy may first be calculated for the signal occupying the band (block 98). An entropy may also be calculated for actual noise associated with the signal (block 100). In some embodiments, it is assumed that the noise present in the channel does not have a Gaussian distribution. Instead, the noise actually within the channel is measured and used to generated the noise only entropy. Different techniques for determining the actual noise of the channel are described below.

After the signal entropy and the noise only entropy have been computed, the rate of the signal occupying the channel may be estimated using this information (block 102). Exemplary techniques for estimating the rate are described below. After the rate has been determined for the detected signal, the method 80 may move on to a new band to be tested (blocks 104, 88). The above-described process may then be repeated for the new band under test. The method 80 may then be repeated until all bands of interest have been tested. In addition to the rate, one or more other parameters or features of a detected signal may be identified based on the pdf when it is determined that a signal is present in the band of interest (e.g., receive power level, signature pulse shape, modulation and coding scheme, timing and/or phase offset relative to a reference, symbol duration, etc.). In some embodiments, the band information, the signal information, and/or the rate information associated with the band under test may be stored in a memory or otherwise recorded for later use. As will be described in greater detail, the collected data for the occupied bands identified during method 80 may eventually be used to select an occupied channel for a SUOC node to co-occupy, such as described in U.S. Application No. 61/723,622, filed on Nov. 7, 2012, entitled "Method and Apparatus For Rate Determination For Secondary Co-Existence Users In Wireless Communication System", and in U.S. Application No. 61/723,639, filed on Nov. 7, 2012, entitled "Cognitive Radio Method And Apparatus For Achieving Ad Hoc Interference Multiple Access Wireless Communication", which are commonly owned with the present application and are hereby incorporated by reference in their entireties.

Figure 4:
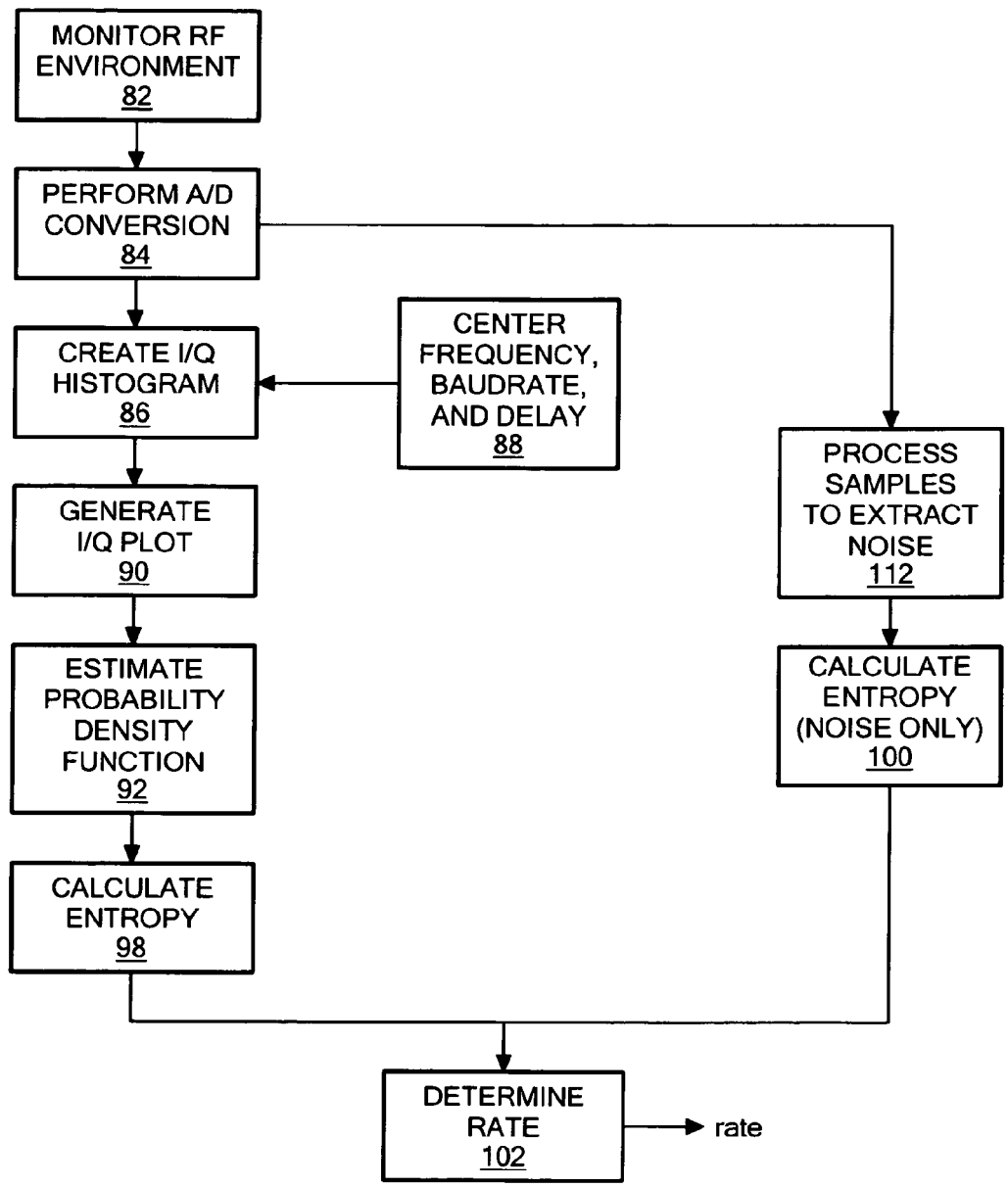
FIG. 4 is a flow diagram illustrating a technique that may be used to estimate actual noise during a rate determination operation in accordance with an embodiment.

An important aspect of the rate determination operation is the calculation of the noise and signal powers. Whether these calculations are computed: (1) as part of a larger cognitive radio system, such as the one described in U.S. Application No. 61/723,622, filed on Nov. 7, 2012, entitled "Method and Apparatus For Rate Determination For Secondary Co-Existence Users In Wireless Communication System", and in U.S. Application No. 61/723,639, filed on Nov. 7, 2012, entitled "Cognitive Radio Method And Apparatus For Achieving Ad Hoc Interference Multiple Access Wireless Communication", (2) separately to allow for the rate determination to be performed within a standalone tool, or (3) as part of a different device or system, the computation of noise and signal powers may be as described herein. FIG. 4 is a flow diagram illustrating a technique that may be used to estimate actual noise during a rate determination operation in accordance with an embodiment. The flow diagram of FIG. 4 is similar to that of FIG. 3, with like reference numerals indicating like actions. As shown, the samples generated during the analog-to-digital conversion of block 84 are processed in a particular manner to extract the noise information of the channel (block 112). The resulting noise information is then used to calculate the noise only entropy (block 100). As described previously, the signal entropy and the noise only entropy may next be used to estimate the rate of the signal occupying the channel (block 102).

Figure 5:
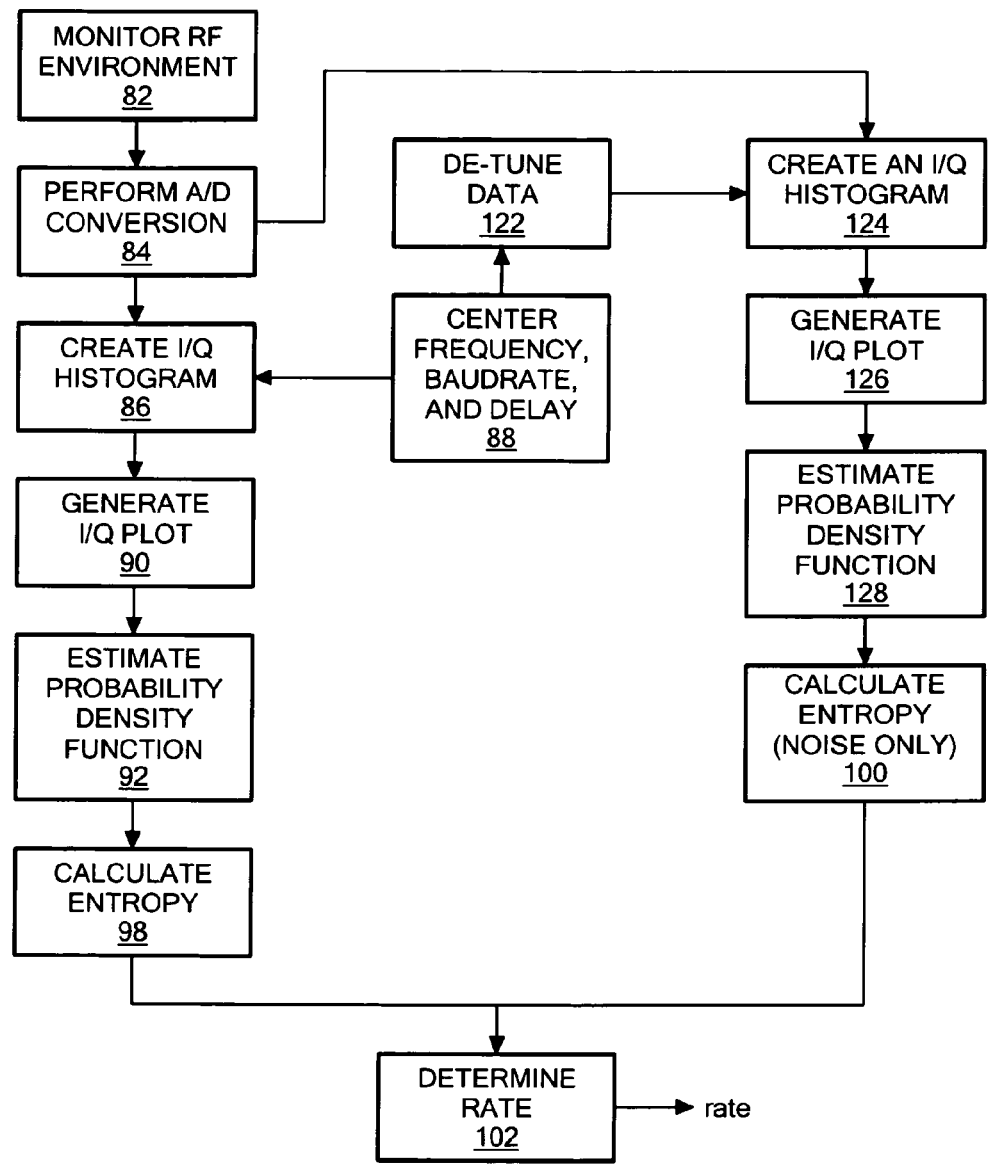
FIG. 5 is a flow diagram illustrating another technique that may be used to estimate actual noise during a rate determination operation in accordance with an embodiment.

FIG. 5 is a flow diagram illustrating another technique that may be used to estimate actual noise during a rate determination operation in accordance with an embodiment. In this technique, similar steps are used to generate the noise information that are used to generate the signal information. The data identifying the band-of-interest (block 88) may first be de-tuned to a band that is known to carry no signal (block 122). An I/Q histogram may then be generated using the de-tuned data (block 124). As before, the original samples may be re-sampled based on the particular combination of center frequency, baud rate, and delay currently being tested. The I/Q histogram for the noise may then be used to generate an I/Q plot (block 126). A noise pdf may next be estimated based on the noise I/Q plot (block 128). The noise only entropy may then be calculated based on the noise pdf (block 100). The rate of the identified signal is then generated using the signal entropy and the noise only entropy (block 102).

Figure 6:
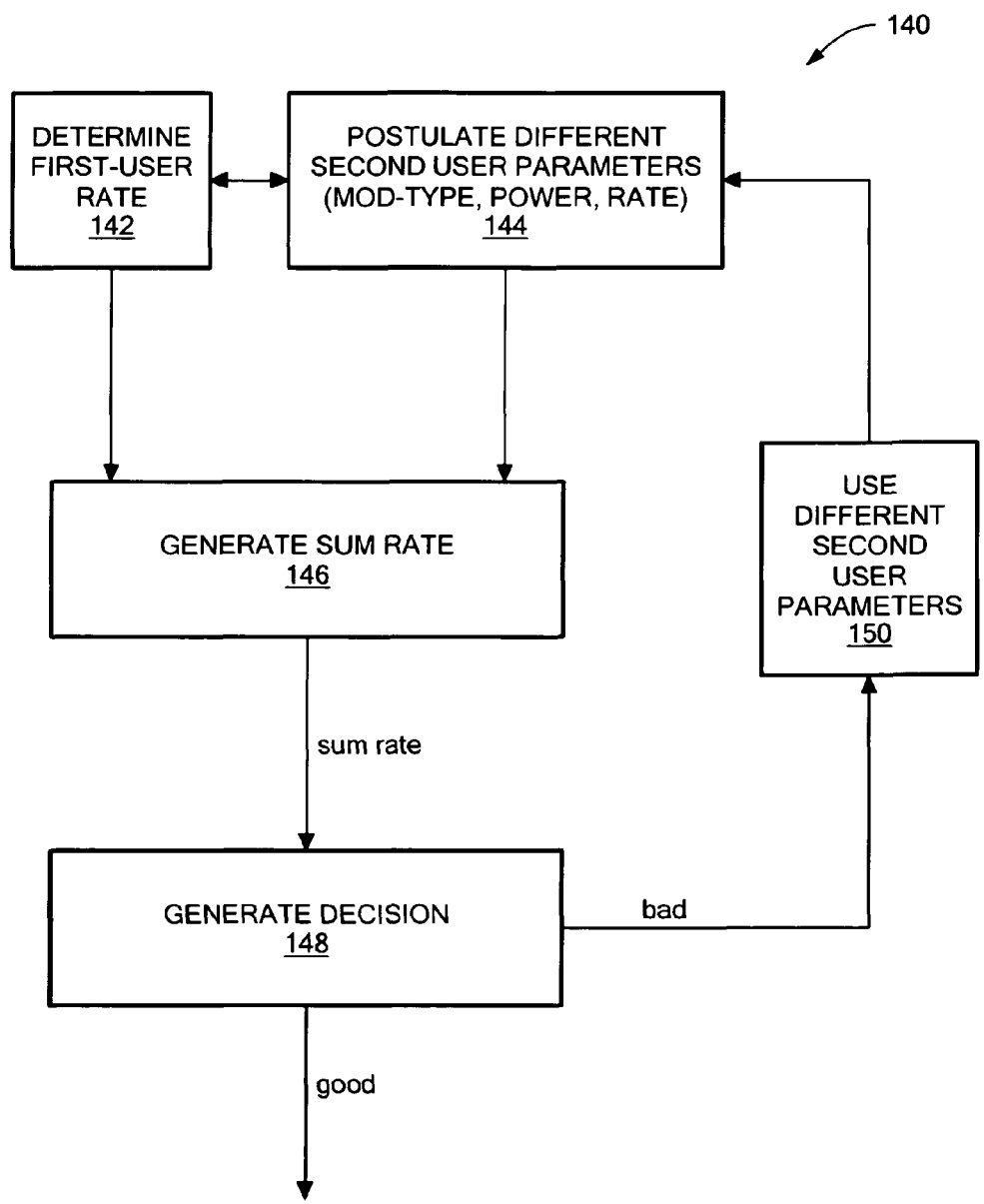
FIG. 6 is a flow diagram illustrating an exemplary method for use in selecting a SUOC/FUOC pair in accordance with an embodiment.

FIG. 6 is a flow diagram illustrating an exemplary method 140 for use in selecting a SUOC/FUOC pair to co-exist within a wireless band or channel in accordance with an embodiment. The method 140 may be used, for example, within a wireless communication device or node to select an occupied channel in a surrounding RF environment within which to operate. A rate may first be determined for a user that is already occupying a particular band (block 142). This rate may be determined using, for example, the method 80 of FIG. 3 or some other method. A number of transmit signal parameter groups may be defined for use by a second user to co-occupy the band with the first user (block 144). The transmit signal parameter groups may each include values for, for example, modulation type, power level, and rate or some other combination of parameters. A first transmit signal parameter group may next be selected. A sum rate may then be generated for the channel including both the first user and the second user (block 146). A decision may then be made as to whether or not the sum rate is acceptable (block 148). If the sum rate is acceptable, then the corresponding set of transmit parameters may be used by a SUOC device to transmit signals within the band of interest. If the sum rate is not acceptable, a different set of transmit parameters may be selected for the second user (block 150) and the process may be repeated.

In an alternative approach, a sum-rate may first be generated for the first user and each of the postulated second user transmit signal parameter groups. The resulting sum rates may be stored in a memory. A FUOC/SUOC combination may then be selected based upon the stored sum rate information. That is, in some implementations, a FUOC/SUOC combination may then be selected that results in a best sum rate in the occupied channel.

In the techniques discussed above, only a single FUOC user is considered. In other embodiments, the method 140 of FIG. 6, or a variation thereof, may be repeated for each of a plurality of different FUOC channels. For each FUOC channel tested, a number of different transmit signal parameter groups may be postulated for use in the corresponding FUOC channel. Sum rates may be determined for each combination as described above. A FUOC/SUOC combination may then be selected based upon the sum rate information. A different FUOC/SUOC pair may then be selected for each other FUOC channel tested. An overall best FUOC/SUOC combination may then be selected from the values associated with the different FUOC channels. Techniques for performing analyses for a number of different FUOC channels as part of a larger radio system are described in more detail in U.S. Application No. 61/723,622, filed on Nov. 7, 2012, entitled "Method and Apparatus For Rate Determination For Secondary Co-Existence Users In Wireless Communication System", and in U.S. Application No. 61/723,639, filed on Nov. 7, 2012, entitled "Cognitive Radio Method And Apparatus For Achieving Ad Hoc Interference Multiple Access Wireless Communication". Techniques for generating the multi-user rate information for a FUOC/SUOC pair are described below.

In an alternative implementation, some or all of these described techniques may be used to provide a computer implemented design analysis tool to analyze, for example, a multiple access channel. The design tool may be used to determine how, for example, different signaling schemes may operate together within a particular band or channel.

Figure 7:
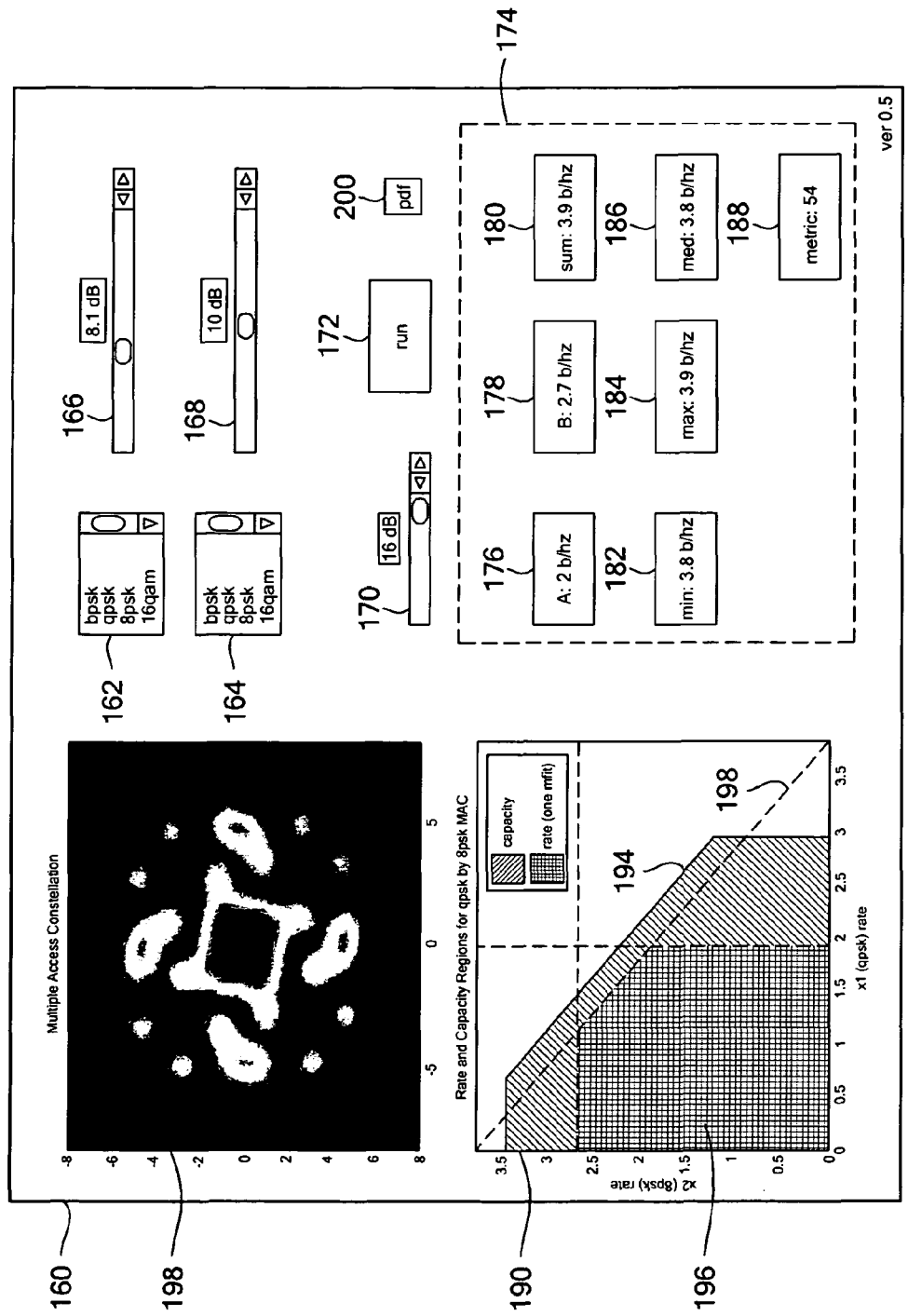
FIG. 7 is a diagram illustrating a graphical user interface (GUI) that may be provided as part of a computer implemented rate tool in accordance with an embodiment.

FIG. 7 illustrates a graphical user interface (GUI) 160 that may be provided as part of a computer implemented rate tool in accordance with an embodiment. As shown, GUI 160 may include list boxes 162, 164 (or other user input elements) for use in selecting a modulation scheme for first and second users, respectively, to occupy a given channel (e.g., a FUOC user and a SUOC user). Any number of different modulation schemes may be provided in the list boxes (e.g., BPSK, QPSK, 8PSK, 16 QAM, and/or others). In addition, GUI 160 may include first and second SNR sliders 166, 168 for use in setting a signal-to-noise ratio (SNR) for the first and second users, respectively. GUI 160 may also include a bit depth slider 170 for use in setting a bit depth for the analysis. After the parameters have been set, a run button 172 may be activated to start the analysis. The results of the analysis may be displayed in a display area 174 of the GUI 160. As shown, results may include rate information for the first and second users 176, 178, a sum rate for the two users operating concurrently 180, and summary sum rate statistic information 182, 184, 186. The results may also include a metric value 188 that is a measure of how far into the rate region the computed MAC rate extends.

In addition to the results in display area 174, GUI 160 may also include a rate plot 190 that displays the rate limits of the FUOC/SUOC pair being analyzed, in a graphical form. As illustrated, rate plot 190 may display a capacity region 194 showing a theoretical capacity limit for the channel occupied by the first and second users. Rate plot 190 may also display a rate region 196 showing a more realistic estimation of achievable rates in the co-occupied channel (or multiple access channel (MAC)). A diagonal line 198 in rate plot 190 corresponds to a sum rate limit of the multiple access channel.

GUI 160 may also have a pdf display region 198 for displaying a pdf associated with the multiple access channel. A pdf button 200 may be provided to initiate the generation of the pdf based on the entered signal parameters. The pdf shown in pdf display region 198 gives a idea of the combined signal constellation of the multiple access channel. It may be used by a designer to determine the propriety of using two signal types together within a particular channel.

In general, a multiple access channel will be characterized by three different rates: a coded rate, a MAC sum rate, and a maximum possible rate for the modulation pair. The coded rate is the maximum possible rate of the data of the two users occupying the channel reduced by the rate r of a corresponding forward error correction (FEC) code (i.e., coded rate=r*(max rate)). The MAC sum rate is the rate achievable in the MAC channel for the indicated modulation schemes, at the SNRs specified. The MAC sum rate is the rate that is determined by the computer implemented rate tool. The maximum possible rate for the modulation pair is dictated by the modulation schemes being used by the first and second users (e.g., 4 bits per channel use when QPSK is being used by both users). In at least one implementation, the metric generated by the rate tool is calculated as follows:

$$\text{metric} = \frac{b-a}{c-a} \times 100$$

where a is the coded rate, b is the sum rate, and c is the max possible rate of the modulation pair. For example, if the MAC channel has two QPSK users operating with a FEC code rate of r=3/4, the max possible rate 'c' would be 2 bits/symbol+2 bits/symbol=4. In this case, the coded rate 'a' would be 4*3/4=3, and if the tool predicted a MAC sum rate 'b' of 3.7 bits/channel use, the metric would be (3.7−3)/(4−3)×100=70.

Figure 8:
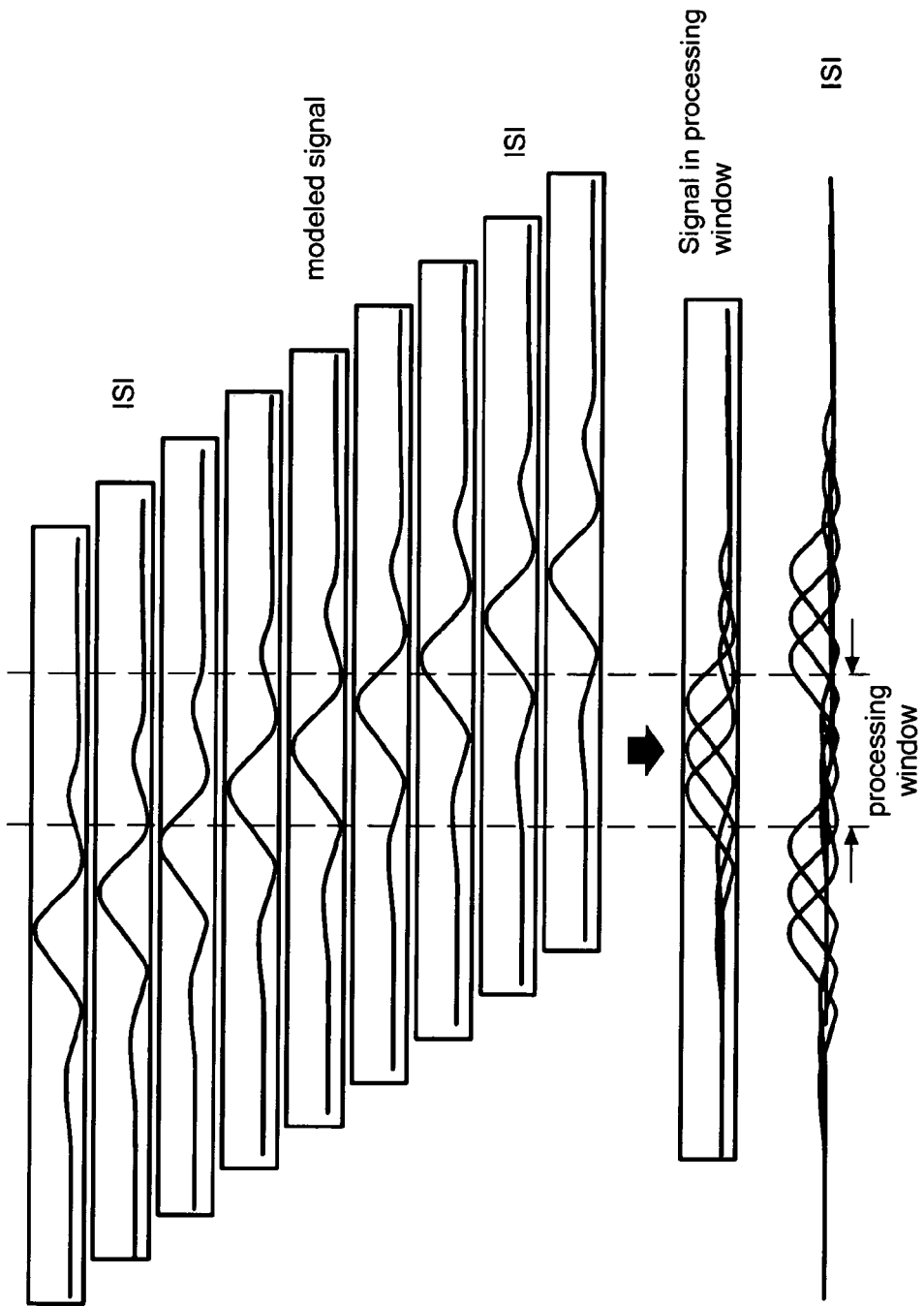
FIG. 8 is a graph illustrating a technique to estimate a maximum sum rate possible for a particular non-optimal multiuser detection (MUD) process by using an optimal MUD process constrained to operate within a processing window having a symbol window size of three in accordance with an embodiment.

In at least one embodiment, a rate determination tool is provided that is capable of estimating the maximum sum rate possible for a variety of different multiuser detection processes. In one approach, the tool may make the approximation that the performance of various types of MUDs can be equated to the performance of an optimal MUD constrained to operate only in a fixed processing window or subset of all the symbols to be decoded. Once this relationship is established, and accounting for the exact pulse shape of the signals being analyzed, the tool may compute the relative amount of energy between the symbols being demodulated and the symbols not being demodulated but falling into the processing window. FIG. 8 illustrates an exemplary scenario when the symbol window size is set to three. Here the total waveform defined by the three symbols extends out to include periods in time where other symbols not being demodulated reside. As shown, these unmodeled symbols may have significant energy leaking into the processing window.

As described, once the relative energy between the modeled and unmodeled symbols is computed, the rate computation may be adjusted. Specifically, the tool may take the signal-to-noise ratio (SNR) of the stronger signal, and compute the power of a white Gaussian noise process that would be equivalent in power to the unmodeled symbols in the processing window. This power may then be added to the power of the thermal noise process that the tool also computes internally. This adjusted power may then be used to compute the rate. Since the noise power was increased, the rate will be accordingly decreased. In one embodiment, the relationship between the MUD process and the window size may be as follows: (1) one symbol—matched filter MUD; (2) three symbols—minimum mean squared error (MMSE) MUD; (3) five symbols—windowed optimal MUD; and (4) seven or more symbols—Optimal, or Maximum Likelihood Sequence Estimation MUD.

In the discussion below, the problem of predicting the usable rate of a multiple access communications channel under real world conditions is addressed. In particular, channels and communications signals that cannot be easily modeled using the usual Gaussian assumptions may be analyzed. This may call for alternative methods of analysis. The multiple access channel arises in the discussion and analysis of a great number of communications systems. Just about any channel of operational significance might be considered a multiple access channel, with secondary users of the channel either cooperating or (hopefully unintentionally) not cooperating with the primary users of the channel.

In some implementations, the rate region of a multiple access channel (MAC) may be determined rather than the capacity region. The term "rate region" is used herein to connote the maximum possible rate and sum rate for a set of users, constrained to a particular communications protocol or constellation. The normal capacity region for a two user MAC would be the set of rate pairs $R_1$ and $R_2$, where:

$$C = (R_1, R_2): 0 \leq R_1 \leq C_X(P_1, \sigma^2)$$

$$0 \leq R_2 \leq C_X(P_2, \sigma^2)$$

$$R_1 + R_2 \leq C_{X_1, X_2}(P_1, P_2, \sigma^2, \rho). \quad (1)$$

First, a multiple access channel with Gaussian noise is addressed. Here, the shorthand $C_X$ is being used to describe the capacity of a single user channel at the given power and noise levels, and $C_{X_1, X_2}$ for the sum capacity of the two users. As computed by Verdu in his paper entitled "The Capacity Region of the Symbol-Asynchronous Gaussian Multiple-Access Channel" (IEEE Trans. Inform. Theory, 35(4):733-751, July 1989), this sum capacity also depends on the correlation between the two users as noted here. As is well known, this capacity can be found by maximizing over choice of distribution the mutual information conveyed from the input to the output of the channel:

$$C = \max\{I(X; Y)\} \quad (2)$$
$$= \max\{H(Y) - H(Y \mid X)\}$$
$$= \max\{H(Y) - H(Z)\},$$

where X is the input of the channel, Y is the output of the channel, and Z is the noise process assumed, independent of the input distributions. This maximization takes place over all possible distributions for the input signal, and is known to be made when the number of usages of the channel and size of the codebook are allowed to be arbitrarily large, and a Gaussian codebook is used. Variations in the choice of formula for the determination of the capacity bound values $C_X$ and $C_{X_1, X_2}$ are considered to be within the scope of the concepts, systems, and techniques described and claimed herein.

In the discussion below, the same parameter will be computed as above, but for a much more restrictive requirement. That is, the rate region will be computed for the case where:
  one usage of a complex valued channel is allowed, and
  each user's codebook is known to be selected from a constellation such as QPSK, 16QAM, etc.

To begin the analysis, the entropy rate for a Gaussian variate will first be described. For a p-dimensional real valued Gaussian vector distributed by:

$$f(x) = \frac{1}{|2\pi\Sigma|^{1/2}} \exp\left\{-\frac{1}{2}(x-\mu)'\Sigma^{-1}(x-\mu)\right\}, \quad (3)$$

the entropy may be calculated as follows:

$$H = \frac{p}{2} + \frac{p}{2}\ln(2\pi) + \frac{1}{2}\ln|\Sigma| \text{ nats, or} \quad (4)$$
$$= \frac{p}{2}\log_2(2\pi e) + \frac{1}{2}\log_2|\Sigma| \text{ bits.}$$

For the case at hand, one (complex) channel usage will be assumed, so the dimensionality is p=2, the varaiate is $x=[x_R, x_I]'$, and the covariance is $\Sigma=(\sigma^2/2)I_{2 \times 2}$. For this case, we arrive at the more commonly known expression for the entropy of the proper complex valued Gaussian variate $H=\log_2\{\pi e \sigma^2\}$ bits per complex channel use. These somewhat basic preliminaries have been necessary, since we are actually interested in computing the rates and entropies due to more complicated distributions or signal constellations than the Gaussian. In fact, we are interested in computing the entropy due to a mixed-Gaussian variate, where the location of the means of the individual Gaussian distributions are due to a signal constellation such as QPSK or 16QAM, or a compound constellation to a multiple user access of the channel.

To compute entropy for a mixed Gaussian variate, the fundamental definition of entropy for the multi dimensional case may be used as follows:

$$H_x = -\int_{-\infty}^{+\infty}\int_{-\infty}^{+\infty}\cdots\int_{-\infty}^{+\infty}\log_2[f(\vec{x})]f(\vec{x})d\vec{x}. \quad (5)$$

For the two-way integration implied by a complex variate and channel, usage of the channel by a communications system employing a Gaussian code book yields the entropies:

$$H(X) = \log_2(\pi e P_X) \quad (6)$$
$$H(Y) = \log_2(\pi e P_X + \pi e \sigma^2)$$
$$H(Z) = \log_2(\pi e \sigma^2)$$

giving the rate $$C = \log_2\left(1 + \frac{P_X}{\sigma^2}\right).$$

This rate, in bits per complex channel use (or bits per symbol), is known to be the capacity of the channel.

Verdu's result on an asynchronous multiple access channel will now be described to show why it is preferential to analyze rate considering only one symbol pair versus the more general result which would consider an entire block of symbols. In the Verdu paper, the following equation is presented:

$$R_{sum} \leq \frac{1}{2n}\log \det \left[ I_{2n} + \frac{1}{\sigma^2}\begin{bmatrix} \Sigma_1 & 0 \\ 0 & \Sigma_2 \end{bmatrix}\begin{bmatrix} I_n & S^T \\ S & I_n \end{bmatrix}\right] \qquad (7)$$

This equation (modified here to account for the n channel uses) was developed for a strictly time-limited transmit pulse. This time limiting has the following effects on the result:

The correlation matrix S becomes strictly bi-diagonal, and if the lesser correlation $\rho_{21}$ is ignored, diagonal. This second case corresponds to the expression 3.6 in Verdu's paper where sum capacity has an additional signal term in the log $\{\cdot\}$ of $(1-\rho^2)P_1P_2/\sigma^4$.

The transmit pulses are not band limited to the baud rate, which apparently means that some portion of the capacity gains associated to decorrelation may in fact be due to bandwidth expansion.

If an additional bandwidth-limited channel use constraint is introduced, each transmitted pulse interferes with every other pulse, and both the cross correlation matrix S and the autocorrelation matrix $I_n$ (last multiplicative term in Equation 7 above) becomes fully populated with correlations. For this case, if we follow through with the analyses used in the Verdu reference, the fully-populated covariance matrix R is first achieved:

$$R = \begin{bmatrix} 1 & \rho_{12}(0) & \gamma(1) & \rho_{12}(1) & \ldots \\ \rho_{12}(0) & 1 & \rho_{21}(0) & \gamma(1) & \ldots \\ \gamma(-1) & \rho_{21}(0) & 1 & \rho_{12}(0) & \ldots \\ \rho_{12}(-1) & \gamma(-1) & \rho_{12}(0) & 1 & \\ \gamma(-2) & \rho_{21}(-1) & \gamma(-1) & & \\ \vdots & \vdots & & & \ddots \end{bmatrix}. \qquad (8)$$

Here, the same naming convention for the correlations is adopted as Verdu, with $\rho_{12}=\rho_{12}(0)$, $\rho_{21}=\rho_{21}(0)$. In addition, the correlations are computed at the different lags, for example, $\rho_{12}(m)=\int s_1(t)\cdot s_2(t-(\tau_{12}+mT))$ and so forth. The autocorrelation terms $\gamma$ are similarly defined, but since these are due to the match filter outputs for each user the delay offset for each $\tau$ is zero, that is $\gamma(m)=\gamma_{11}(m)=\gamma_{22}(m)=\int s_k(t)\cdot s_k(t-mT)$. If we follow through with the analysis, permuting both the rows and columns of the data and correlations, we arrive at the bandwidth constrained version of Verdu's equation:

$$R_{sum} \leq \frac{1}{2n}\log \det\left[ I_{2n} + \frac{1}{\sigma^2}\begin{bmatrix} \Sigma_1 & 0 \\ 0 & \Sigma_2 \end{bmatrix}\begin{bmatrix} \Gamma & S^T \\ S & \Gamma \end{bmatrix}\right]. \qquad (9)$$

This results in the fully populated correlation matrices as follows:

$$S = \begin{bmatrix} \rho_{12}(0) & \rho_{12}(1) & \rho_{12}(2) & \rho_{12}(3) & \ldots \\ \rho_{12}(-1) & \rho_{12}(0) & \rho_{12}(1) & \rho_{12}(2) & \ldots \\ \rho_{12}(-2) & \rho_{12}(-1) & \rho_{12}(0) & \rho_{12}(1) & \ldots \\ \rho_{12}(-3) & \rho_{12}(-2) & \rho_{12}(-1) & \rho_{12}(0) & \\ \vdots & \vdots & \vdots & & \ddots \end{bmatrix}, \text{ and} \qquad (10)$$

$$\Gamma = \begin{bmatrix} \gamma(0) & \gamma(1) & \gamma(2) & \gamma(3) & \ldots \\ \gamma(-1) & \gamma(0) & \gamma(1) & \gamma(2) & \ldots \\ \gamma(-2) & \gamma(-1) & \gamma(0) & \gamma(1) & \ldots \\ \gamma(-3) & \gamma(-2) & \gamma(-1) & \gamma(0) & \\ \vdots & \vdots & \vdots & & \ddots \end{bmatrix}. \qquad (11)$$

In these equations, the fact that $\rho_{21}(m)=\rho_{12}(m+1)$ has been used throughout, if both pulses are the same.

This extension to the rate computation has considerable impact on the predicted rate, and for nearly band limited pulses, typically reduces the rate nearly to the point of the "fully correlated" case, $\rho=1$. In addition, care has to be taken to:

allow the block size to be large enough in the computation to avoid any edge effects, and account for even/odd tiling which may flip the sign of the determinant.

The four cases will now be compared against all relative symbol delays between zero and one half of a baud. These cases are:

1. fully correlated, $\tau_{12}=0$ (not dependent on baud offset, plot plotted anyway)

2. One correlation accounted for $\rho_{12}$ . . . see Equation 3.6 in Verdu

3. Two correlations accounted for $\rho_{12}$ and $\rho_{21}$ . . . see Equation 3.23 in Verdu 4. Equation 9 above, all correlations accounted for.

Figure 9:
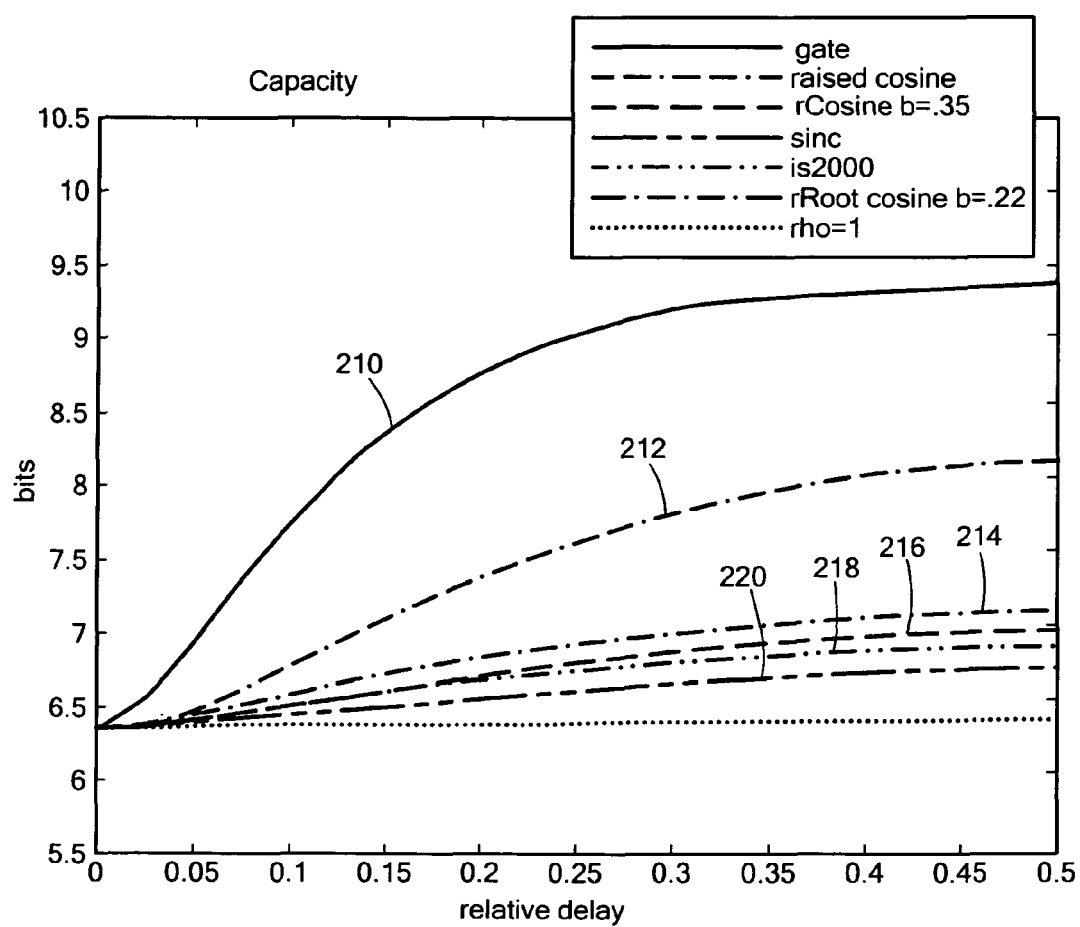
FIG. 9 is a graph illustrating asynchronous capacity at different baud offsets computed for several different pulse shapes.

Expanding on this analysis, the constrained bandwidth relation of Equation 9 is now used to show that the different methods of evaluating the capacity really correspond to different assumptions on the time and/or band limited nature of the transmit pulses. If enough terms are included in the correlation matrices, it shouldn't matter what sort of pulse is used, a correct capacity computation corresponding to the bandwidth of the pulse would follow. For these purposes, FIG. 9 is presented where a variety of pulse shapes have all been evaluated using the extended relation of Equation 9. The curve 210 (gate) shows a dramatic capacity enhancement at the expense of a higher bandwidth channel use. The other curves 214, 216, 218, 220 (raised root cosine β=0.22, raised cosine β=0.35, is 2000 pulse, and sine pulse, respectively) all show the modest capacity enhancement of a nearly band limited pulse, while curve 212 (raised cosine) is somewhere in between.

Now the same thing will be computed, but for the case of a well organized codebook. The term "well organized" is used here to denote the case where the codebook has been laid out in the complex plane such that the minimum distance between any two constellation points has been controlled, and no single distance is smaller than a typical distance, common to many pairs of points. Furthermore, to make the initial computations, the limiting case of high SNR will be used, such that the minimum distance is much greater in scale than the noise variance. That is:

$$d_{min}^2 \geq k\cdot\sigma^2 \qquad (12)$$

for some constant k. This will not be possible in the multi-access channel, especially when random phasing and amplitude variations are allowed on the individual users, but for the single user channel will provide a usable rate bound. The probability density function of interest now will be:

$$f_Y(\vec{y}) = \frac{K_{\mu,\Sigma}}{N_C} \sum_{i=1}^{N_C} \mathcal{N}(\vec{y}, \mu_i, \Sigma), \quad (13)$$

where $N_C$ is the number of constellation points in the signaling codebook, and $\mathcal{N}(\vec{y},\mu_i,\Sigma)$ is the Gaussian pdf evaluated at the point $\vec{y}$, with mean $\mu_i$ (the constellation point), and covariance $\Sigma$. The constant $K_{\mu,\Sigma}$ is functionally dependent on the set of constellation points $\mu$ and the covariance of the noise $\Sigma$, and normalizes the pdf $f_Y$ so that it integrates to one. Usage of the codebook is assumed random (i.e., each constellation point is weighted equally in the Gaussian mixture). The entropy at the channel output is:

$$H_Y = -\int_{-\infty}^{+\infty}\int_{-\infty}^{+\infty} \log_2\left[\frac{K_{\mu,\Sigma}}{N_C}\sum_{i=1}^{N_C}\mathcal{N}(y,\mu_i,\Sigma)\right]\cdot\frac{K_{\mu,\Sigma}}{N_C}\sum_{j=1}^{N_C}\mathcal{N}(y,\mu_j,\Sigma)d\vec{y}. \quad (14)$$

The assumption that the noise variance is significantly smaller than the smallest inter-constellation distance allows the integration to be broken into regions around each constellation point as follows:

$$H_Y = -\int_{-\infty}^{+\infty}\int_{-\infty}^{+\infty}\sum_{i=1}^{N_C}\left\{\log_2\left[\frac{1}{N_C}\mathcal{N}(y,\mu_i,\Sigma)\right]\cdot\frac{1}{N_C}\mathcal{N}(y,\mu_i,\Sigma)\right\}d\vec{y} \quad (15)$$

$$= -\frac{1}{N_C}\int_{-\infty}^{+\infty}\int_{-\infty}^{+\infty}\sum_{i=1}^{N_C}\left\{\log_2\left[\frac{1}{N_C}\right]\cdot\mathcal{N}(y,\mu_i,\Sigma)\right\}d\vec{y} + H_Z$$

$$= \log_2(N_C) + H_Z.$$

In this case, the individual contributions to the Gaussian mixture do not substantially overlap, and the normalizing constant $K_{\mu,\Sigma}=1$.

Formally, the rate we wish to compute would be the maximum over choice of codebook $\mu$ with the Power fixed at $P_X$, and the number of constellation points in $\mu$ fixed to $N_C$. This rate would be:

$$R = \max_\mu\{C \mid X \in \mu\} \quad (16)$$

$$= \max_\mu\{I(X;Y) \mid X \in \mu\}$$

$$= \max_\mu\{(H(Y) - H(Z)) \mid X \in \mu\},$$

which implies moving the constellation points around to maximize $d_{min}^2$ and avoid the possible non-white noise $\Sigma$. This, however, results in essentially the same high SNR argument we have here. With a fixed number of constellation points, some arrangement of them will best achieve $d_{min}^2 \geq k\cdot\sigma^2$, and with that arrangement, the best possible rate would be:

$$R = \max_\mu\{(H(Y) - H(Z)) \mid X \in \mu\} \quad (17)$$

$$= \log_2(N_C).$$

As we will see, any violation of this distance requirement will degrade this rate, however no arrangement of constellation points subject to the $N_C$ constraint can increase this rate. The result is highly intuitive, for a single usage of the complex channel, a QPSK constellation (4 points) has a rate limit of 2 bits/channel use; a 16QAM constellation (16 points), 4 bits; and so on.

While nearly impossible to achieve, this maximum rate is also the best rate available in the synchronous multiple access channel. The number of constellation points would be the number of points in the sum constellation, which is the outer or Hadamard product of the two constituent constellations, and:

$$N_{MAC} = N_{X_1} * N_{X_2}. \quad (18)$$

Following all of the same arguments as before, the max rate available would simply be the sum of the two constituent rates. This will not be readily available however, especially if there is no method available to control the relative phase of the two signals. This rate can sometimes be achieved when the SNR difference between the two users is large, say 10 dB, but the distance constraint must still be met for the weaker user.

Figure 10:
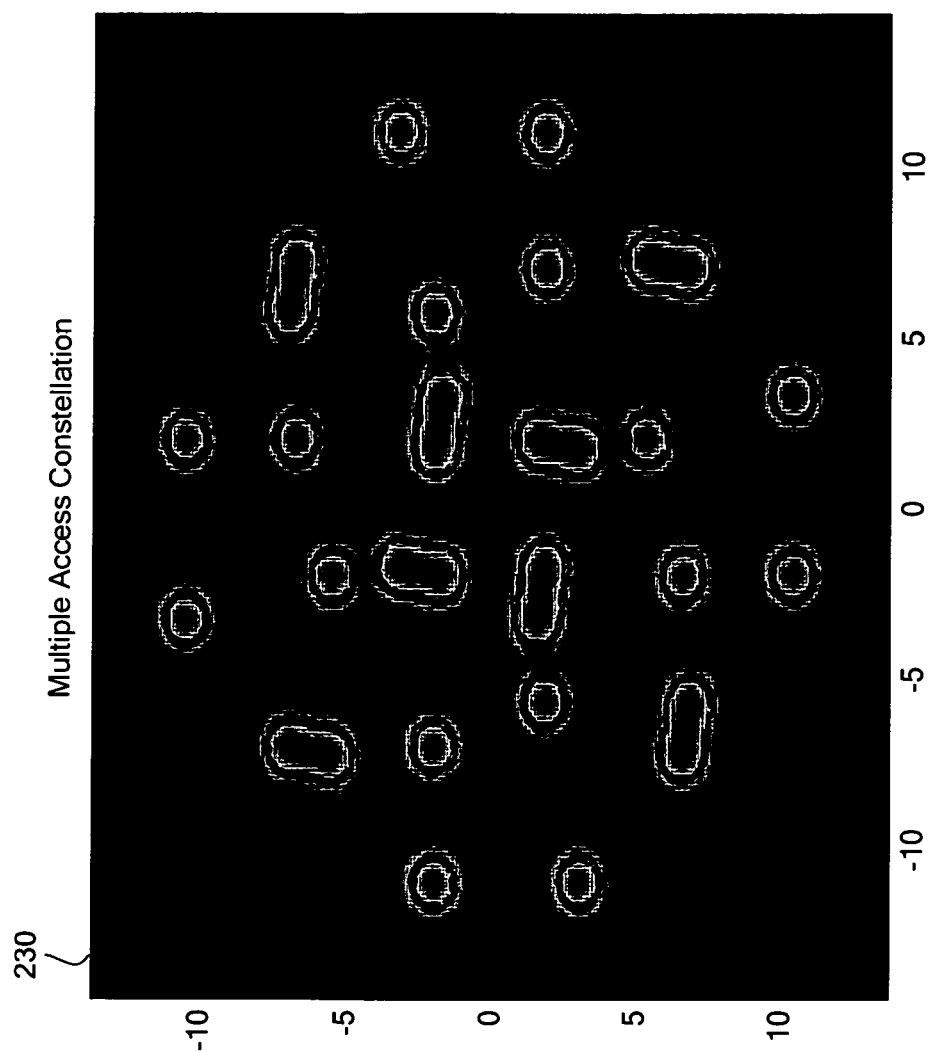
FIG. 10 is a diagram illustrating a multiple access constellation for a relatively high SNR, 8PSK by QPSK multiple access channel having a phase offset of 37 degrees.

FIG. 10 shows the constellation, by way of a pdf 230, for a relatively high SNR case 8PSK by QPSK multiple access channel. Here, the 8PSK user is at an SNR of 17 dB, the QPSK user is at an SNR of 14 dB, and the phase offset is 37 degrees. It would be expected that the sum constellation would have thirty two discrete points, and while this figure does exhibit this, a subset of sixteen points seem to be close to merging to eight. Nevertheless, the sum rate should be close to R=log₂ (32)=5, and the constituent single user rates are almost identically 3 (8PSK) and 2 (QPSK) bits each.

Figure 11:
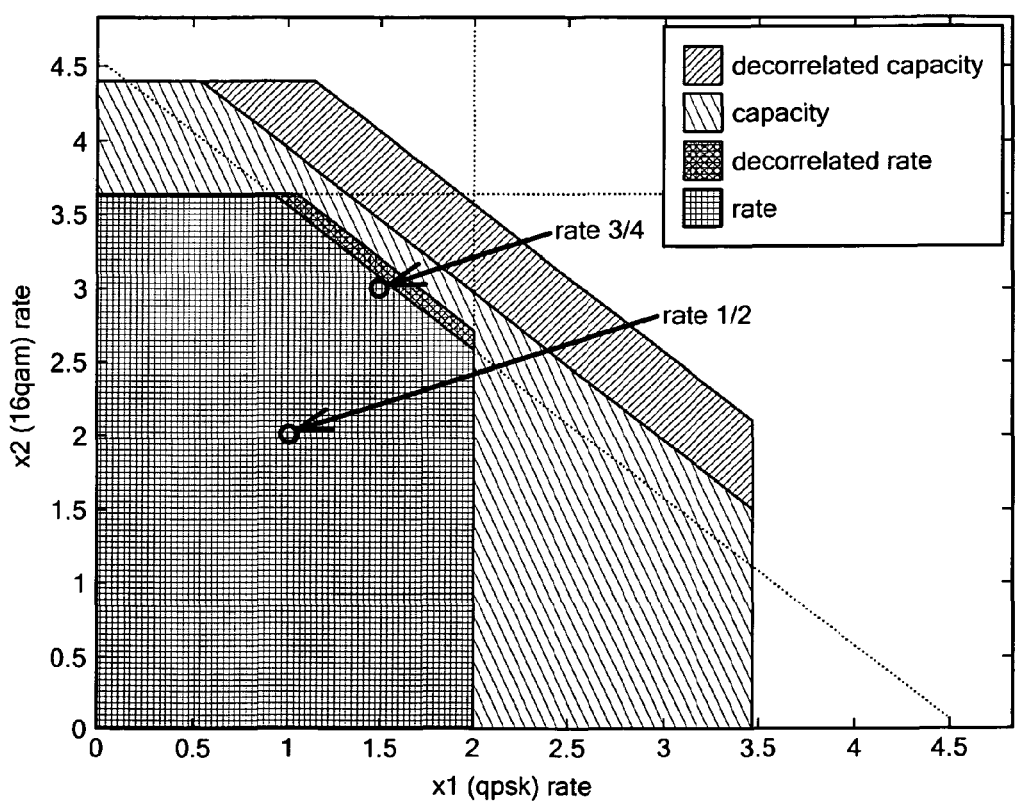
FIG. 11 is a diagram illustrating a rate region and a capacity region for a QPSK by 16QAM multiple access channel.

In practice, such high SNR and well organized cases rarely arise. At more typical SNRs, even the single user constellations and pdfs tend to mix substantially, and the limiting arguments leading to Equation 15 fall apart. In these situations, there is no recourse other than to evaluate Equation 14 numerically, and evaluate the rates. This type of computation is similar to the rate computation specified in the paper "Channel Coding with Multilevel/Phase Signals," by Ungerboeck, IEEE Trans. Inform. Theory, 28(1):55-67, January 1982, used here for the compound signal constellation. To do this, the expected range of the pdf may be pixelated in the real and imaginary directions, the pdf evaluated, and the integral approximated by any viable numerical integration routine. The computation of capacity and rate can be summarized for a case like this with a typical rate region diagram, such as FIG. 11. This figure corresponds to the results summarized in Table 1 below.

TABLE 1

|  | User 1 | User 2 |
| --- | --- | --- |
| Mod | 8PSK | QPSK |
| SNR | 10 dB | 7 dB |
| capacity (bits) | 3.46 | 2.59 |
| rate (bits) | 2.68 | 1.88 |
| sum capacity (bits) | 4 | |
| sum rate (bits) | 3.69 | |

In the discussions above regarding the sum capacity for a specific codebook, the problem was considered for a synchronous case. This means that the sufficient statistic for the multiple access demodulation of the communications signals would be one matched filter, and each signal passes through the matched filter unattenuated onto the same I/Q decision region. As seen for the capacity relations, proper computation of the rate for band limited signals would prescribe that an entire block of symbols be considered, with the corresponding fully populated correlation matrix. As a first step in this direction, the introduction of one additional correlation term in the analysis will first be considered (compare, e.g., $\rho_{12}$ in Verdu's equation 3.23).

It is well known that the sufficient statistic for the asynchronous case would be two matched filters, each tuned individually to the signal of interest. For a block of symbols, this would be the matched filter outputs sampled at every baud offset in the block. Presently one pair will be considered, which yields a four-dimensional decision domain (I/Q on two separate but correlated regions). Formally, the matched filter statistics would be:

$$m_1 = s_1^H(X_1 + X_2 + Z)$$

$$m_2 = s_2^H(X_1 + X_2 + Z), \quad (19)$$

which gives the joint pdf for the matched filter outputs of:

$$\begin{bmatrix} m_1 \\ m_2 \end{bmatrix} \sim \mathcal{N}\left(\begin{bmatrix} a_1 b_1 + \rho a_2 b_2 \\ \rho^* a_1 b_1 + a_2 b_2 \end{bmatrix}, \sigma^2 \begin{bmatrix} 1 & \rho \\ \rho^* & 1 \end{bmatrix}\right). \quad (20)$$

Here it is noted that $a_i b_i$ is the scaled information symbol for user i (constellation point), and the correlation coefficient $\rho = s_1^H s_2$. The posterior pdf for the matched filter data $\vec{m} = [m_1, m_2]^T$, given one of the (combinations of the) transmitted constellation points would be:

$$p_m = C \cdot \exp\left\{-\frac{1}{\sigma^2(1-|\rho|^2)}(|d_1|^2 + |d|^2 - 2Re[\rho d_1^* d_2])\right\}, \quad (21)$$

where the pdf at the point $p = p(x_1, y_1, x_2, y_2, k)$ is evaluated for the constellation point k. The vector distances are:

$$d_1 = (x_1 + iy_1) - (a_1 b_1(k) + \rho a_2 b_2(k))$$

$$d_2 = (x_2 + iy_2) - (\rho^* a_2 b_1(k) + a_2 b_2(k)). \quad (22)$$

The constellation points k are enumerated in such a way that $k = [1:N_{X_1}, N_{X_2}]$ ranges over every possible combination of information symbols.

The procedure for numerical computation is identical to the previous analysis, but much more demanding. For example, we have empirically determined that for a great variety of cases, a pixelization of approximately 50,000 pixels (225 by 225 on an I/Q plot) yields acceptable entropy estimates. This holds for a variety of constellation types such as 4-8-16 QAM, and over a variety of SNRs from 0 to 40. A simple application of the same scale of estimation would require 2.5 billion pixels for the 4-D $\rho \ne 1$ case. The procedure for rate computation remains the same:

Pixelate the range of indices for the pdf computations [$x_1$, $y_1$, $x_2$, $y_2$] in such a manner that accurate numerical integration of the entropy will be possible.

at each pixel, compute for each constellation point the probability given by Equation 21, and sum normalize the entire pdf to sum to one compute the entropy by Equation 21, but use a four-way integration over the domain of $p_m$.

(option 1) do the same for the noise only entropy, with one constellation point=[0,0,0,0]

(option 2) compute the noise entropy directly by Equation 23, (p=4)

$$H(Z) = \frac{p}{2}\log_2(2\pi e) + \frac{1}{2}\log_2\left|\sum\right| \quad (23)$$

$$= \frac{1}{2}\log_2([2\pi e]^p|\sum|)$$

$$= 2\log_2\left(\pi e \sigma^2 \sqrt{1-|\rho|^2}\right).$$

Having accomplished these computations, the rate is simply R=H(Y)–H(Z). The two options for computation of H(Z) are mentioned due to the inherent biasing of the entropy estimation which is exacerbated by overly coarse pixelation of the pdf. This happens when trying to limit the computational burden of the method. If the biasing becomes problematic, in many cases computation of H(Z) by option 1 will exhibit the same biasing as the computation of H(Y), and as such will tend to self-normalize the rate computation R=H(Y)–H(Z).

Recalling the previous discussion of capacity computation for nearly band limited pulses, we know that the computation we have outlined here is only valid for a strictly time-limited pulse. To make the proper computation of rate here, we would have to fill out the decision space to include an entire block of symbols, roughly extended in time to cover the extent of the transmit pulse. For many pulses of interest, this would mean approximately a dozen baud or so, and the corresponding dimension of the probability density function to include all of these interfering symbols, twice this dimension. Since such a computation would require computer resources beyond those available in applications of the subject matter invention today, an alternate implementation is also provided and claimed. If the rate computation follows the same tendencies as the capacity computation, rate expansion for a band limited pulse will be modest, and it is better to consider only the time aligned, single matched filter case.

Thus far, the computation of entropy and rate has been examined directly, by computing the probability density functions p(Y) and p(Z)=p(Y|X) analytically. Numerical integration was subsequently used to compute the entropies, but the initial probability densities were analytically known. It is also possible, and sometimes necessary, to estimate the required probability density functions rather than compute them. To see why this is true, the entropy relations of Equation 2 may be revisited, and the conditional entropy which led to the noise term may be more formally expanded out, as follows:

$$H(Y|X) = H(Y|X_1, X_2) \quad (24)$$

$$= -\sum_{x_1, x_2, y} p(x_1, x_2, y)\log_2\{p(y|x_1, x_2)\}$$

$$= -\sum_{x_1, x_2}\sum_y p(x_1)p(x_2)p(y|x_1, x_2)\log_2\{p(y|x_1, x_2)\}$$

-continued $$= -\sum_{x_1, x_2} \frac{1}{N_{x_1}, N_{x_2}} \sum_y p(y \mid x_1, x_2) \log_2\{p(y \mid x_1, x_2)\}$$

If the pdf p(y|x$_1$, x$_2$) is the same at all sum constellation points, then as before H(Y|X)=H(Z), but in general this will not be the case. Equation 24 shows that the required posterior entropy will be the mean of all the marginal entropies, taken individually at each constellation point. All is not lost, however. That is, a sufficient number of realizations of Y can be generated, under the more complicated noise and distortion process of interest, and the required probability density functions can then be estimated. A sufficient number of realizations will include enough realizations to both estimate p(y) and the individual pdfs p(y|x$_1$, x$_2$). To estimate the pdfs, the examples and strategy of the paper "Fast Algorithms for Mutual Information Based Independent Component Analysis" by D. T. Pham, IEEE Trans. Signal Processing, 52(10): 2629-2700, October 2004 (which is hereby incorporated by reference in its entirety) may be used. This strategy essentially trades off the competing requirements of realization count, pdf bin size, and estimation smoothing kernel size.

Figure 12:
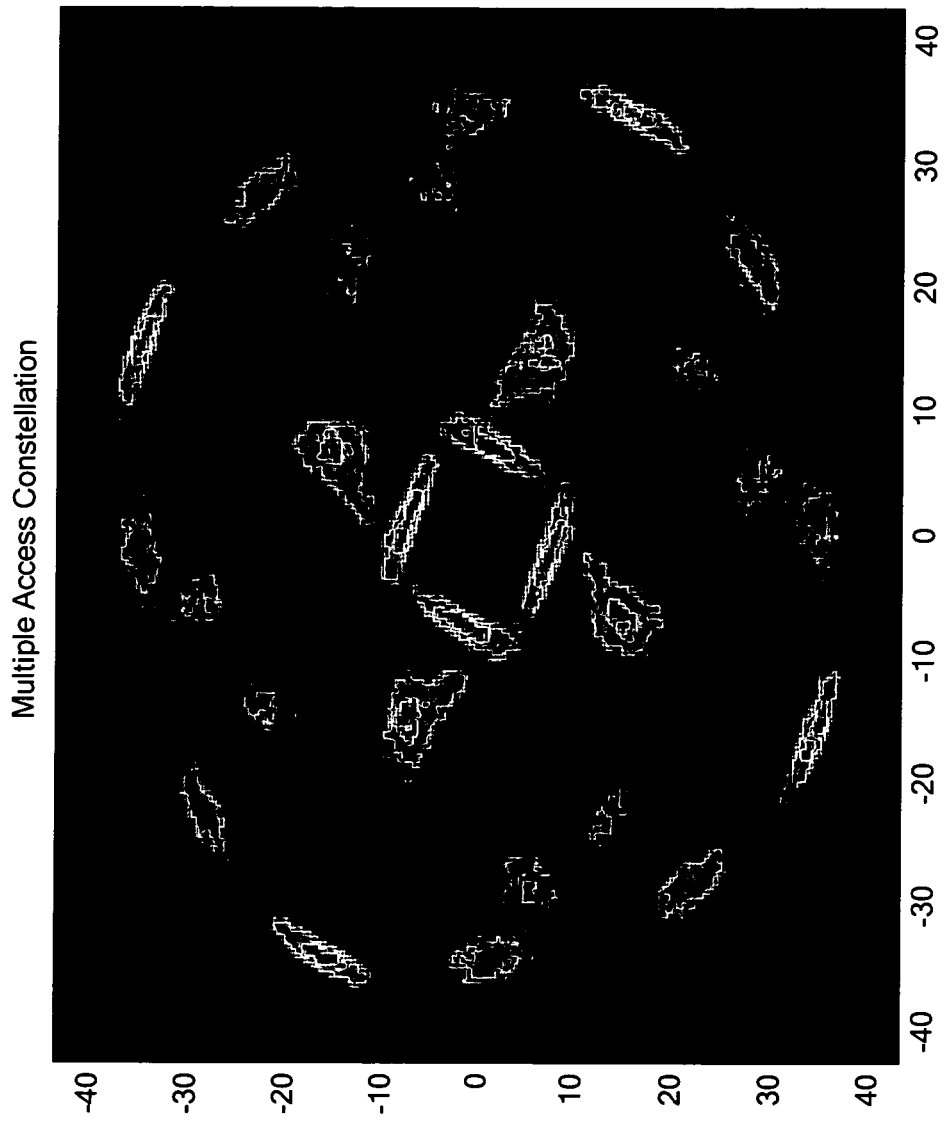
FIG. 12 is a diagram illustrating a multiple access constellation for a high SNR, 8PSK by QPSK multiple access channel having a phase offset of 73 degrees and a phase uncertainty of 8 degrees of standard deviation.

FIG. 12 shows a case where such a method may be required. Here, the same 8PSK by QPSK case that was analyzed earlier is presented, but a phase uncertainty is added into the model. This might be the case, for example, if a carrier phase is wandering or jittering on one or both of the signals, and data is being processed over some finite window of interest. The uncertainty added here was a standard deviation of 8 degrees on the carrier phase of both signals. Clearly the shape and orientation of the marginal noise distributions changes with each constellation point, and must be accounted for. Entropy will be invariant to translations and rotations, but not to shape changes, and in these situations the marginal pdfs cannot be combined or averaged prior to the entropy computation.

Figure 13:
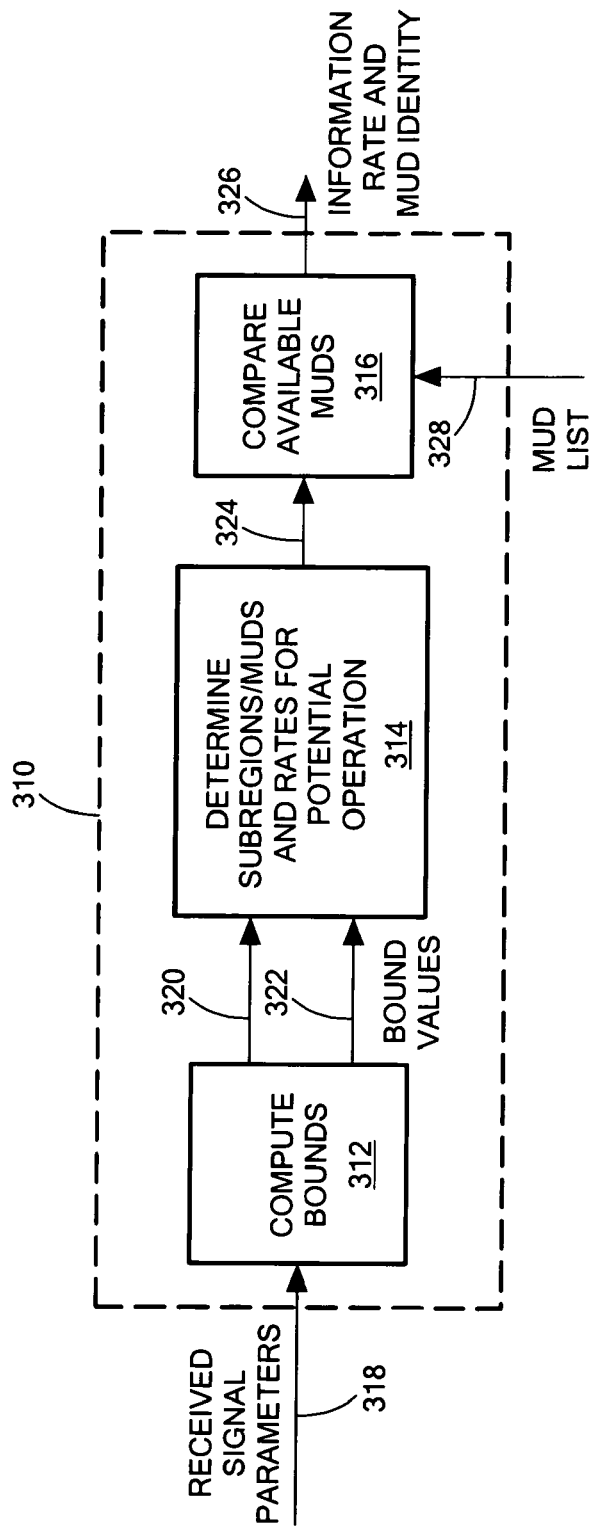
FIG. 13 is a block diagram illustrating a subsystem that may be used to choose a SUOC transmission rate and to choose a MUD receiver type for use in a receiver of a SUOC device in accordance with an embodiment.

FIG. 13 is a block diagram illustrating a subsystem 310 that may be used to choose a SUOC transmission rate and to choose a MUD receiver type for use in a receiver of a SUOC device in accordance with an embodiment. Often, the choice of MUD in a receiver was decided at the time of production of that receiver node, hence a SUOC receiver would have only one MUD. In this case subsystems 310 would be used to choose a SUOC transmission rate given the type of MUD receiver that exists on the SUOC receiver and the specific interference the SUOC receiver experiences from the interfering FUOC transmitter. The subsystem 310 may be implemented within, for example, the wireless transceiver system 50 of FIG. 2 (e.g., in rate determination unit 300 and/or decision making unit 400) or in other systems or node devices. As illustrated, subsystem 310 includes a first computation unit 312 to compute bounds of one or more rate regions associated with FUOC/SUOC combinations, a second computation unit 314 to determine sub-region/MUD pairs within the rate region that may be used, and a third computation unit 316 to, for example, narrow down the list of sub-region/MUD pairs output by second computation unit 314 based on, for example, MUD receiver types or processes that are available within the SUOC device. As shown, third computation unit 316 may have an input 328 to receive a list of the available MUD receiver types in the associated SUOC device. Third computation unit 316 may output a recommended rate for the SUOC and the type of MUD to use in the SUOC receiver (if more than one MUD type is implemented in the SUOC receiver) at an output 326. Although illustrated as separate units, it should be appreciated that, in some embodiments, the functions of the second and third processing units 314, 316 may be performed together. That is, many permutations of comparisons are possible for an equivalent determination of output on line 324 of unit 314 and the operations performed within units 314 and 316 could be combined and reordered in numerous ways to achieve the same result at output 326.

During operation, first computation unit 312 may receive received signal parameters at an input 318 thereof. These received signal parameters are the parameters of the FUOC and SUOC signals received in the SUOC device that were generated by signal characterization (e.g., generated by RF characterization unit 200 of FIG. 2, etc.). These parameters may include, for example, received FUOC signal to noise ratio (SNR), normalized cross correlation between this FUOC's received signal signature pulse and the SUOC's received signature pulse, the expected symbol timing offset of the SUOC received signal relative to the FUOC received signal (if that is something that the SUOC radios can control, if not, the worst case of zero may be used), received SUOC SNR (note that this is not signal to interference plus noise ratio (SINR), however, if SINR can be measured, the bounds computed in unit 150 can be generated equivalently to accommodate SINR), received FUOC signal modulation type (e.g., QPSK, etc.), error correction coding rate (if the error correction code used by the FUOC is known and can be decoded by the SUOC receiver, otherwise, code rate may be set to 1), and/or others.

Figure 14:
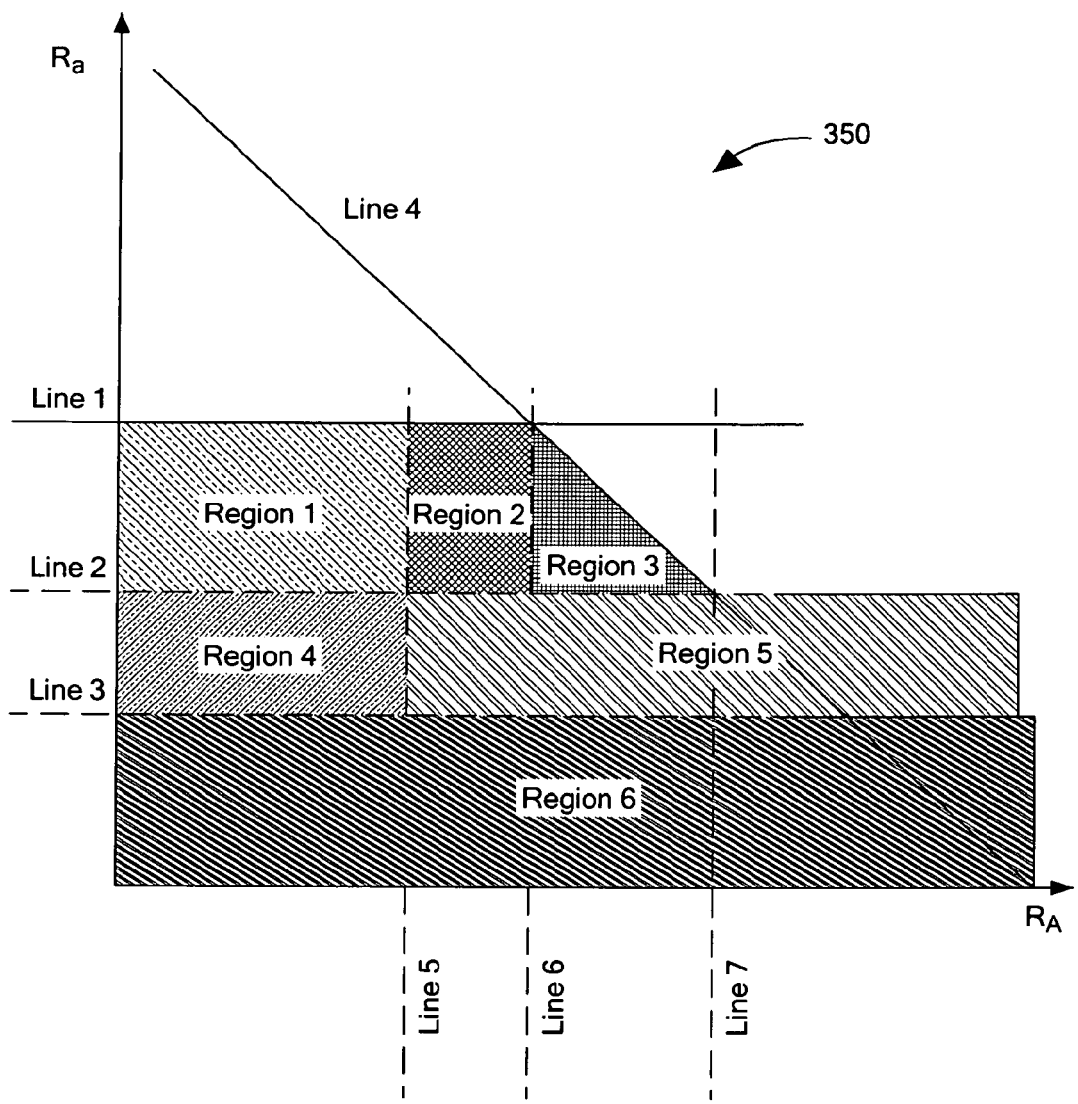
FIG. 14 is a diagram of a rate region that illustrates the various bounds (lines) that may be computed within the first computation unit of FIG. 13.

First computation unit 312 may process the received signal parameters to compute the bounds of a corresponding rate region for the FUOC/SUOC pair. As will be described in greater detail, FIG. 14 is a diagram of a rate region 350 that illustrates the various bounds (lines) that may be computed within the first computation unit 312. First computation unit 312 may output the FUOC's information rate (e.g., modulation rate×code rate) as output 320. First computation unit 312 may also output values corresponding to the lines that delineate the boundaries in the rate region diagram as output 322.

Second computation unit 314 may use the information received from first computation unit 312 to determine subregions in the rate diagram that correspond to particular MUD receiver types or processes that can be used to successfully close the link with the SUOC transmitter in the presence of the FUOC interfering signal for SUOC-FUOC rate pairs that fall within the various regions (e.g., see regions 1-6 in the rate region diagram 350 of FIG. 14). Note that although it is not possible to show in the figure, regions 5 and 6 continue indefinitely to the right. The vertical axis in the figure corresponds to the transmission rate of the SUOC transmitter and the horizontal axis in the figure corresponds to the transmission rate of the FUOC transmitter. In one possible implementation, the regions may be assigned to MUD receiver techniques as follows. Region 1 may be associated with a Matched Filter (MF) Successive Interference Canceller (SIC) MUD in which the FUOC's signal is detected first, then re-created and stripped off the received signal, followed by a conventional SUOC signal derived MF receiver on the remaining signal to demodulate the SUOC's signal. Region 2 may be associated with a Minimum Mean Squared Error (MMSE) SIC MUD in which the FUOC's signals are detected first using the FUOC-focused MMSE filter, then re-created and stripped off the received signal, followed by a conventional SUOC signal derived MF receiver on the remaining signal to demodulate the SUOC's signal. Region 3 may be associated with an optimum or near-optimum MUD such as a maximum aposteriori MUD known to those versed in the art of multiuser detection as the BCJR MUD, the Maximum Likelihood Sequence Estimator (MLSE) MUD, a reduced state BCJR or MLSE such as an "M" or "T" algorithm, or a Turbo MUD. Region 4 may be associated with either the MF-SIC MUD (see region 1 above) or the MMSE described below in connection with Region 5. Region 5 may be associated with a SUOC-focused MMSE MUD. It should be noted that there is no need to apply the FUOC-focused bank of the MMSE filter if the SUOC receiver is not interested in demodulating the FUOC's signal. Region 6 may be associated with a SUOC-derived MF that treats the FUOC signal as noise. This is a conventional receiver that does not employ MUD. It should be noted that the each of the above-listed MUD receiver techniques are well known to those versed in the art of multi-user detection receivers. The regions focus on delineating the possible SUOC transmission rate in context of the MUD with was is projected to be the MUD capable of successful demodulation using the lowest implementation burden. Each region of this diagram is associated with more MUDs than those listed above, for example, each region will correspond to successful demodulation if any of the "region 3" MUDs were to be used, but since these MUDs are typically of the highest complexity, they are only listed in association with region 3

As described above, FIG. 14 illustrates an achievable rate region 350 parsed into six sub-regions (region 1 through region 6). The sub-regions are delineated by various rate lines (line 1 through line 7). The values of the rate lines may be computed within, for example, the first computation unit 312 of FIG. 13. Each of the rate lines may be computed using a corresponding equation. In at least one implementation, these equations may be defined as follows. The equation for rate line 1 is:

$$R_a = \frac{1}{2}\log\left[1 + \frac{P_a}{N}\right] = \frac{1}{2}\log(1 + SNR_a),$$

the equation for rate line 2 is:

$$R_a = \frac{1}{2}\log\left[1 + \frac{P_a + P_A}{N} + \frac{P_a P_A}{N^2}(1-\rho^2)\right] - \frac{1}{2}\log\left[1 + \frac{P_A}{N}\right] =$$
$$\frac{1}{2}\log(1 + SNR_a + SNR_A + (1-\rho^2)SNR_a SNR_A) - \frac{1}{2}\log(1 + SNR_A),$$

the equation for rate line 3 is:

$$R_a = \frac{1}{2}\log\left[1 + \frac{P_a + P_A}{N}\right] - \frac{1}{2}\log\left[1 + \frac{P_A}{N}\right] =$$
$$\frac{1}{2}\log(1 + SNR_a + SNR_A) - \frac{1}{2}\log(1 + SNR_A),$$

the equation for rate line 4 is:

$$R_a + R_A = \frac{1}{2}\log\left[1 + \frac{P_a + P_A}{N} + \frac{P_a P_A}{N^2}(1-\rho^2)\right] =$$
$$\frac{1}{2}\log(1 + SNR_a + SNR_A + (1-\rho^2)SNR_a SNR_A),$$

the equation for rate line 5 is:

$$R_A = \frac{1}{2}\log\left[1 + \frac{P_a + P_A}{N}\right] - \frac{1}{2}\log\left[1 + \frac{P_a}{N}\right] =$$
$$\frac{1}{2}\log(1 + SNR_a + SNR_A) - \frac{1}{2}\log(1 + SNR_A),$$

the equation for rate line 6 is:

$$R_A = \frac{1}{2}\log\left[1 + \frac{P_a + P_A}{N} + \frac{P_a P_A}{N^2}(1-\rho^2)\right] - \frac{1}{2}\log\left[1 + \frac{P_a}{N}\right] =$$
$$\frac{1}{2}\log(1 + SNR_a + SNR_A + (1-\rho^2)SNR_a SNR_A) - \frac{1}{2}\log(1 + SNR_a),$$

and
the equation for rate line 7 is:

$$R_A = \frac{1}{2}\log\left[1 + \frac{P_A}{N}\right] = \frac{1}{2}\log(1 + SNR_A)$$

where $P_A$=FUOC's Received Power as measured by or estimated to exists at the SUOC Receiver; $P_a$=SUOC Transmitter's Received Power as measured by or estimated to exist at the SUOC Receiver; N=Noise Only Power measured by SUOC Receiver, $SNR_A$=FUOC's Received Signal to Noise Ratio as measured by or estimated to exist at the SUOC Receiver; $SNR_a$=SUOC's Received Signal to Noise Ratio measured by or estimated to exist at the SUOC Receiver, $\rho$=Cross Correlation of the FUOC's and the SUOC's received signature pulses measured by or estimated to exist at the SUOC Receiver location where: $\rho=\int_0^T s_a(t)s_A(t)dt$; $s_A(t)$=FUOC's Received Signature Symbol Pulse Waveform (normalized to have unit energy) as seen at the SUOC Receiver, and thus would include any channel effects on both of the received signature pulses; $s_a(t)$=SUOC's Received Signature Symbol Pulse Waveform (normalized to have unit energy) as seen at the SUOC Receiver, and thus would include any channel effects on both of the received signature pulses; and T=Baud duration.

It should be noted that the above equations may be modified using basic algebra operations to generate numerous other expressions that might be advantageous for implementation, depending upon a specific platform being used. In addition, it should be noted that the above expressions may be modified using basic algebra operations to be based upon signal to interference plus noise ratio (SINR) if that quantity is more easily estimated in a particular implementation. It should be noted that the above equations may be modified to accommodate situational variations such as the case where the two interfering signals have different baud rates, where alternations known to one versed in the art of multiuser detection and parameter estimation may be applied to adapt the equations appropriately to address any situational effects that have not been specifically addressed in the above model for the received signals.

If the transmit SUOC can maintain a baud timing offset relative to the FUOC's signal received at the SUOC receiver, then the above equations may be adjusted to provide this advantage. For example, Lines 2, 4 and 6 may be modified by replacing the term:

$$\frac{1}{2}\log\left[1 + \frac{P_a + P_A}{N} + \frac{P_a P_A}{N^2}(1-\rho^2)\right]$$

with:

$$\frac{1}{2}\text{logdet}\left[I_n + \frac{1}{N}X\right]$$

where $[I_n]$ is the n×n identity matrix where:

$$X = \frac{1}{\sigma^2}\begin{bmatrix} \Sigma_1 & 0 \\ 0 & \Sigma_2 \end{bmatrix}\begin{bmatrix} I_n & S^T \\ S & I_n \end{bmatrix} \quad \Sigma_k = \text{cov}(X_k^n)$$

and:

$$S = \rho_{aA}I_n + \rho_{aA}\begin{bmatrix} 0 & 1 & & 0 \\ & \ddots & \ddots & \\ & & \ddots & 1 \\ 0 & & & 0 \end{bmatrix}$$

where:

$\rho_{aA} = \int_0^T s_a(t)s_A(t+\tau_a-\tau_A)dt$; and $\rho_{Aa} = \int_0^T s_a(t)S_A(t+T\tau_a-\tau_A)dt$.

It should be noted that variations in the choice of all of the above formulae for the determination of the rate bounds as well the formulae for parameter values used within the computations of rate bounds are considered to be within the scope of the concepts, systems, and techniques described and claimed herein. It should be noted that formulae used to compute bounds and parameters may be substituted with values obtained through estimation and learning algorithms that determine the size, location, and associated MUDs for the different sub-regions within the rate region.

In some implementations, the subsystem 310 of FIG. 13 may determine in which sub-regions of the rate region 350 the FUOC's rate (RA) falls. For each of the sub-regions that contains the FUOC's rate, subsystem 310 may determine the maximum rate that is possible for the corresponding SUOC (Ra) given the MUD receiver(s) that is (are) available within the receiver SUOC. As described previously, second computation unit 314 may determine sub-region/MUD pairs that may be used to support the MAC. Third computation unit 316 may then narrow down the list of sub-region/MUD pairs to only those that can be used by the SUOC receiver, given the MUD receiver types that are available within the SUOC receiver.

Figure 15A:
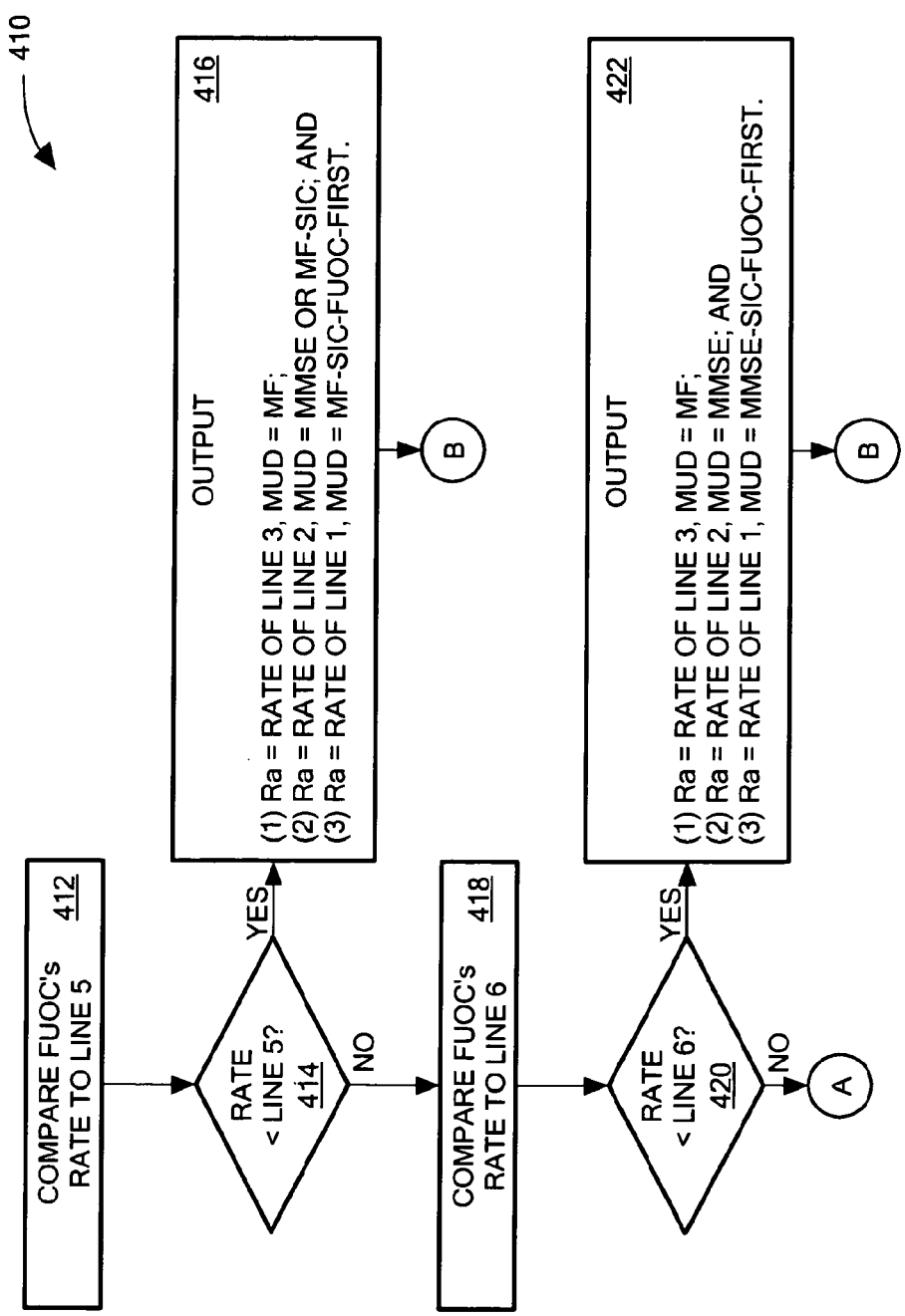
FIGS. 15A and 15B are portions of a flowchart illustrating a method for determining a recommended rate for a SUOC and a type of MUD receiver to use in the SUOC in accordance with an embodiment.
Figure 15B:
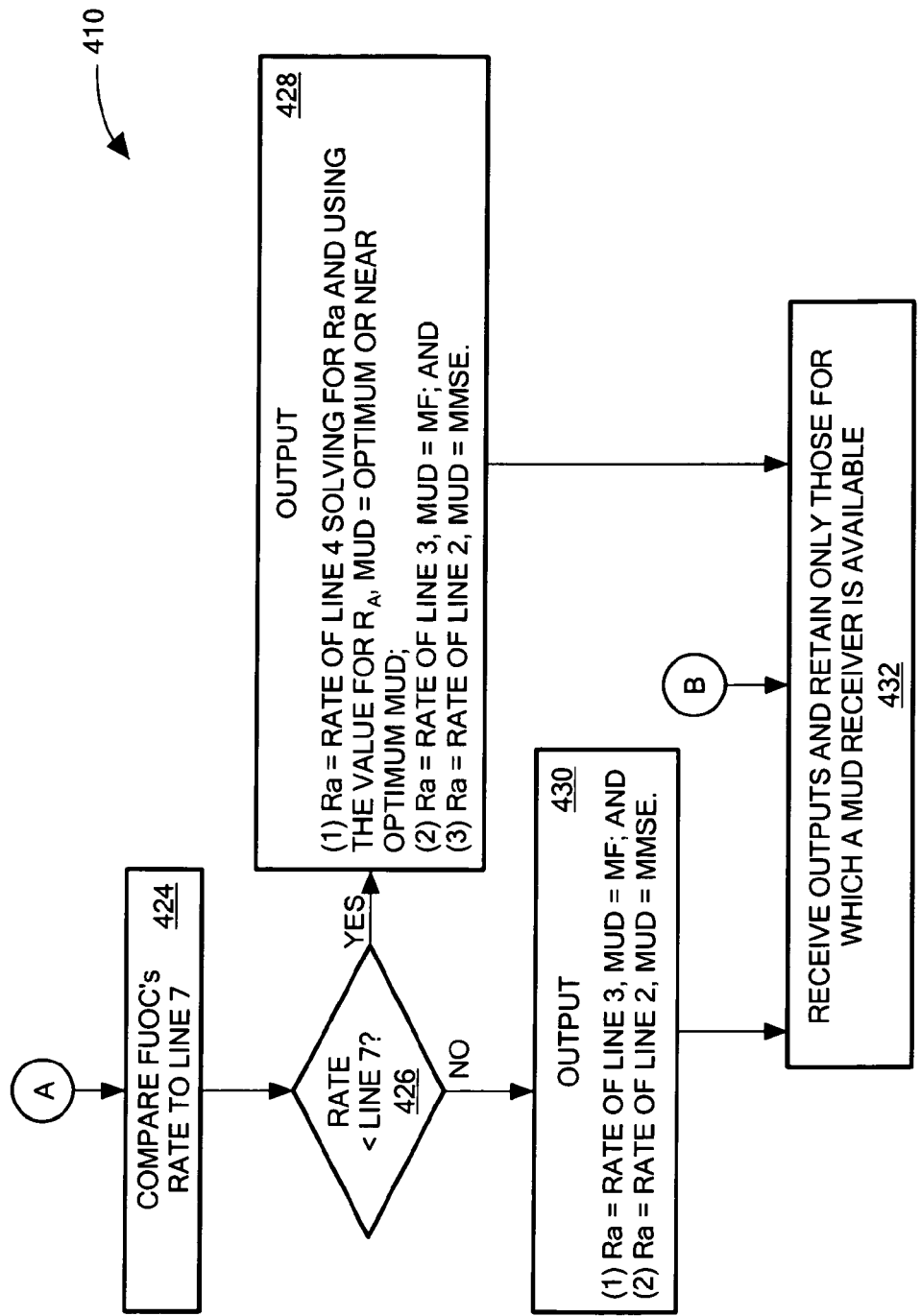

FIGS. 15A and 15B are portions of a flowchart illustrating a method 410 for determining a recommended rate for a SUOC and a type of MUD receiver to use in the SUOC in accordance with an embodiment. In some implementations, the method 410 of FIGS. 15A and 15B may be performed within, for example, the second and third computation units 314, 316 of FIG. 13. With reference to FIG. 15A, a FUOC's rate may first be compared to a rate associated with line 5 of the rate region 350 of FIG. 14 (block 412). If the FUOC's rate is smaller than the rate associated with line 5 (block 414-Y), then the following pairs of values may be output by second computation unit 314: (1) Ra=value computed using equation for line 3, MUD=MF; (2) Ra=value computed using equation for line 2, MUD=MMSE or MF-SIC; and (3) Ra=value computed using equation for line 1, MUD=MF-SIC-FUOC-first (block 416). If the FUOC's rate is not smaller than the rate associated with line 5 (block 414-N), the FUOC's rate may next be compared to a rate associated with line 6 of the rate region (block 418). If the FUOC's rate is smaller than the rate associated with line 6 (block 420-Y), then the following pairs of values may be output by second computation unit 314: (1) Ra=value computed using equation for line 3, MUD=MF; (2) Ra=value computed using equation for line 2, MUD=MMSE; and (3) Ra=value computed using equation for line 1, MUD=MMSE-SIC-FUOC-first (block 422).

Referring now to FIG. 15B, if the FUOC's rate is not smaller than the rate associated with line 6 (block 420-N in FIG. 15A), the FUOC's rate may next be compared to a rate associated with line 7 of the rate region (block 424). If the FUOC's rate is smaller than the rate associated with line 7 (block 426-Y), then the following pairs of values may be output by second computation unit 314: (1) Ra=value computed using equation for line 4 solving for Ra and using the value for RA, MUD=optimum or near optimum MUD; (2) Ra=value computed using equation for line 3, MUD=MF; and (3) Ra=value computed using equation for line 2, MUD=MMSE (block 428). If the FUOC's rate is not smaller than the rate associated with line 7 (block 426-N), then the following pairs of values may be output by second computation unit 314: (1) Ra=value computed using equation for line 3, MUD=MF; and (2) Ra=value computed using equation for line 2, MUD=MMSE (block 430). After the second computation unit 314 has output its values as described above, the third computation unit 316 may retain only those combinations for which a MUD receiver is available within the SUOC receiver (block 432). The retained combinations may then be output by the third computation unit 316 on line 326. If the SUOC receiver does not possess any of the identified MUDs, the third computation unit 316 may output a rate of Ra=0. The method 410 may then terminate.

In at least one implementation, techniques described herein may be embodied as computer executable instructions and/or data structures stored on a computer readable medium. For example, in some implementations, the rate tool described above may be implemented as software stored on a computer readable medium. The computer readable medium (or media) may include one or more of, for example, magnetic data storage devices, disc based storage devices, optical storage devices, semiconductor memories, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or others, including combinations of the above.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:
1. A machine implemented method for determining a rate for a second user on channel (SUOC) in a multiple access channel (MAC) having a first user on channel (FUOC) and the SUOC, the method comprising:
    measuring operational parameters associated with the FUOC and the SUOC;

calculating rate lines associated with a rate region of the MAC using the measured operational parameters;

determining a rate associated with the FUOC;

comparing the rate associated with the FUOC to the rate lines of the rate region to identify a list of possible rates and corresponding multi-user detector (MUD) receiver types for use by the SUOC; and selecting a rate and a MUD receiver type for the SUOC from the identified list.

2. The method of claim 1, further comprising:

determining MUD receiver types that are available to the SUOC; and removing entries from the list that require MUD receiver types that are not available.

3. The method of claim 1, wherein:

measuring operational parameters associated with the FUOC and the SUOC comprises measuring one or more of the following: received power associated with the FUOC, transmitter received power associated with the SUOC, noise only power measured by a SUOC receiver, received signal to noise ratio (SNR) associated with the FUOC, received SNR associated with the FUOC, cross correlation of received signature pulses of the FUOC and the SUOC, and baud duration.

4. The method of claim 1 further comprising:

estimating a maximum sum rate that can be achieved if the SUOC co-occupies the RF band with the FUOC, for a number of different transmit parameter combinations of the SUOC; and selecting a transmit parameter combination for the SUOC based, at least in part, on estimated sum rate.

5. The method of claim 1, wherein:

the transmit parameter combinations each include at least one of: a modulation type, a power level, and a rate.

6. The method of claim 1, wherein:

determining a data rate, estimating a maximum stun rate, and selecting a transmit parameter combination are performed within a communication device associated with the SUOC.

7. The method of claim 1, further comprising:

monitoring said RE band to detect RF energy within the RF band before determining the rate for the FUOC;

characterizing RF energy received during monitoring; and determining whether the RE band is currently occupied by a user based on the characterization.

8. The method of claim 7, wherein determining a data rate for a FUOC operating in the RE band comprises:

calculating an entropy of a signal within the RF band;

calculating an entropy of noise associated with the signal; and determining a rate for the signal within the RF band based, at least in part, on the entropy of the signal and the entropy of the noise.

9. The method of claim 7, wherein characterizing energy received during monitoring comprises:

creating an in-phase/quadrature (I/Q) histogram based on the received energy;

generating an I/Q plot using the I/Q histogram; and estimating a probability density function (pdf) based on the I/Q plot.

10. The method of claim 9, wherein:

determining whether the RF band is currently occupied by a user based on the characterization comprises analyzing the pdf to identify indicia of a structured signal.

11. The method of claim 10, wherein:

analyzing the pdf to identify indicia of a structured signal includes analyzing the pdf to identify a constellation associated with a specific modulation scheme.

12. The method of claim 9, wherein:

creating an I/Q histogram includes creating the I/Q histogram based on a specific combination of center frequency, baud rate, and delay.

13. The method of claim 12, wherein:

creating an I/Q histogram includes re-sampling samples generated during digitizing based on the specific combination of center frequency, baud rate, and delay.

14. The method of claim 1, wherein:

estimating a maximum sum rate that can be achieved if a SUOC co-occupies the RF band with the FUOC includes considering the availability and complexity of one or more multi-user detector (MUD) in a wireless device associated with the SUOC.

15. An apparatus for determining a rate for a second user on channel (SUOC) in a multiple access channel (MAC) haying a first user on channel (FUOC) and the SUOC, the apparatus comprising:

an RF characterization means for measuring operational parameters associated with the FUOC and the SUOC;

a rate determination means for:

calculating rate lines associated with a rate region of the MAC using the measured operational parameters, and determining a rate associated with the FUOC; and a decision making means for:

comparing the rate associated with the FUOC to the rate lines of the rate region to identify a list of possible rates and corresponding multi-user detector (MUD) receiver types for use by the SUOC, and selecting a rate and a MUD receiver type for the SUOC from the identified list.

16. The apparatus of claim 15, the decision making means further for:

determining MUD receiver types that are available to the SUOC; and removing entries from the list that require MUD receiver types that are not available.

17. The apparatus of claim 15, wherein:

measuring operational parameters associated with the FUOC and the SUOC comprises measuring one or more of the following: received power associated with the FUOC, transmitter received power associated with the SUOC, noise only power measured by a SUOC receiver, received signal to noise ratio (SNR) associated with the FUOC, received SNR associated with the FUOC, cross correlation of received signature pulses of the FUOC and the SUOC, and baud duration.

* * * * *

UNITED STATES PATENT AND TRADEMARK OFFICE
CERTIFICATE OF CORRECTION

PATENT NO. : 9,693,351 B2
APPLICATION NO. : 14/437350
DATED : June 27, 2017
INVENTOR(S) : Rachel E. Learned It is certified that error appears in the above-identified patent and that said Letters Patent is hereby corrected as shown below:

In the Specification

Column 1, Lines 5-6, delete "CROSS REFERENCE TO RELATED APPLICATION" and replace with --CROSS REFERENCE TO RELATED APPLICATIONS--

Column 11, Line 40, delete "generated" and replace with --generate--

Column 13, Line 25, delete "each other" and replace with --each of the other--

Column 18, Line 66, delete "$d_{min}{}^2 \geq \cdot \sigma^2$" and replace with --$d^2_{min} \geq k \cdot \sigma^2$--

Column 19, Line 62, delete "$d_{min}{}^2$" and replace with --$d^2_{min}$--

Column 19, Line 66, delete "$d_{min}{}^2 \geq \cdot \sigma^2$" and replace with --$d^2_{min} \geq k \cdot \sigma^2$--

Column 21, Line 48, delete "$d_2 = (x_2 + iy_2) - (\rho * a_2 b_1(k) + a_2 b_2(k))$." replace with --$d_2 = (x_2 + iy_2) - (\rho * a_1 b_1(k) + a_2 b_2(k))$.--

Column 25, Line 15, delete "that the each" and replace with --that each--

Column 26, Line 26, delete "exists" and replace with --exist--

Column 27, Line 31, delete "well the" and replace with --well as the--

In the Claims

Column 29, Line 36, delete "stun" and replace with --sum--

Signed and Sealed this
Twenty-fifth Day of June, 2019

Andrei Iancu
*Director of the United States Patent and Trademark Office*

CERTIFICATE OF CORRECTION (continued)
U.S. Pat. No. 9,693,351 B2

Column 29, Line 42, delete "RE" and replace with --RF--

Column 29, Line 45, delete "RE" and replace with --RF--

Column 29, Line 48, delete "RE" and replace with --RF--